(12) United States Patent
Weihl et al.

(10) Patent No.: US 7,841,044 B1
(45) Date of Patent: Nov. 30, 2010

(54) DUAL-DEFLECTOR RIDING BLOWER

(75) Inventors: Rick A. Weihl, 3675 Whitehall Rd., Muskegon, MI (US) 49445; Chris Robbins, Muskegon, MI (US)

(73) Assignee: Rick A. Weihl, Muskegon, MI (US)

( * ) Notice: Subject to any disclaimer, the term of this patent is extended or adjusted under 35 U.S.C. 154(b) by 1100 days.

(21) Appl. No.: 11/535,188

(22) Filed: Sep. 26, 2006

(51) Int. Cl.
*E01H 1/08* (2006.01)
*A47L 5/34* (2006.01)

(52) U.S. Cl. .......................... 15/340.1; 15/361; 15/418

(58) Field of Classification Search ............... 15/300.1, 15/316.1, 340.1, 340.2, 349, 331, 405, 418–422, 15/361
See application file for complete search history.

(56) References Cited

U.S. PATENT DOCUMENTS

| | | | | |
|---|---|---|---|---|
| 4,078,365 A | * | 3/1978 | Ingalls | 56/328.1 |
| 4,118,826 A | * | 10/1978 | Kaeser | 15/328 |
| 5,735,018 A | * | 4/1998 | Gallagher et al. | 15/405 |
| 5,826,416 A | * | 10/1998 | Sugden et al. | 56/320.2 |
| 6,253,416 B1 | * | 7/2001 | Lauer et al. | 15/361 |

| | | | | |
|---|---|---|---|---|
| 7,419,106 B2 | * | 9/2008 | Eavenson et al. | 239/461 |

OTHER PUBLICATIONS

Rick A. Weihl, Hesko Horizontal Blowers (brochure), 1999, one (1) page, Livonia, Michigan, USA.

* cited by examiner

*Primary Examiner*—Dung Van Nguyen
(74) *Attorney, Agent, or Firm*—Price, Heneveld, Cooper, DeWitt & Litton, LLP

(57) ABSTRACT

A riding debris mover for moving debris on a surface from a first location to a second location comprises a frame coupled to a riding platform adapted to support a user, and a plurality of wheels coupled to the frame comprising at least two opposing traction wheels for driving the riding blower. A power source is coupled to the frame and is operatively coupled with at least the two traction wheels, whereby the traction wheels are rotated independently and the riding blower is propelled. A blower assembly has an air inlet opening and an air outlet opening, the blower assembly being supported by the frame and operatively coupled with the power source, whereby the blower assembly generates a stream of air from the air outlet opening. A deflector assembly is associated with the blower assembly and comprises at least one movable deflector, whereby the at least one movable deflector can be independently moved between an open position, a closed position, and a position intermediate the open position and closed position, to control the air flow and air flow velocity of the stream of air generated by the blower assembly.

27 Claims, 19 Drawing Sheets

DUAL-DEFLECTOR RIDING BLOWER

BACKGROUND OF THE INVENTION

1. Field of the Invention

The invention relates to yard maintenance equipment and more particularly to a riding air-powered debris mover that is used to clear or collect debris and the like from yards and paved surfaces.

2. Description of the Related Art

Yard maintenance air blowing equipment is commonly known to provide a blower on a hand cart-style frame. These known blowers are operated by a user pushing the cart-style blower unit about the surface to be cleaned. While the use of cart-style blowers can be attractive for small areas because of their sharp turning capabilities, their manual operation is burdensome when maintaining large areas.

Alternatively, it is known to mount centrifugal fan blower units to tractors or other yard vehicles and the like. These vehicle-mounted blower arrangements address the burden of traversing large yard areas, but compromise maneuverability. They do not provide a degree of maneuverability that is required along the perimeter of a yard. Thus, a vehicle-mounted blower is often supplemented with a cart-style blower. Further, the vehicle-mounted blowers commonly have the blower unit at the rear of the vehicle, behind the user and out of view during operation. This is inefficient and unsafe, requiring the user to turn around to watch the blower, rather than facing forward in the direction of travel.

Known blowers are frequently provided with a transmission for disconnecting the blower unit from the power supply. Such a transmission adds cost and weight to the blower, and can result in increased maintenance and repairs. Alternatively, when blowing is not desired, the power supply can be shut off. This can be inefficient and hard on equipment which must be repeatedly shut down and restarted. Furthermore, many blowers provide a flow of air which is limited to a constant air flow and velocity, and cannot be controlled to accommodate differences in debris type and condition. Thus, supplemental cleanup activities, such as raking or sweeping, may be required.

SUMMARY OF THE INVENTION

In a first embodiment, a riding debris mover for moving debris on a surface from a first location to a second location comprises a frame coupled to a riding platform adapted to support a user, and a plurality of wheels coupled to the frame comprising at least two opposing traction wheels for driving the riding blower. A power source is coupled to the frame and is operatively coupled with at least the two traction wheels, whereby the traction wheels are rotated independently and the riding blower is propelled. A blower assembly has an air inlet opening and an air outlet opening, the blower assembly being supported by the frame and operatively coupled with the power source, whereby the blower assembly generates a stream of air from the air outlet opening. A deflector assembly is associated with the blower assembly and comprises at least one movable deflector, whereby the at least one movable deflector can be independently moved between an open position, a closed position, and a position intermediate the open position and closed position, to control the air flow and air flow velocity of the stream of air generated by the blower assembly.

In a second embodiment, to a debris mover for moving debris on a surface from a first location to a second location comprises a power source adapted to rotate a shaft, and a blower assembly having an air inlet opening and an air outlet opening and comprising an impeller operatively coupled with the power source. The impeller comprises at least one impeller blade for moving air through the blower when the impeller is rotated by the power source whereby the blower assembly generates a stream of air from the air outlet opening. A safety cage is adapted for coupling with the air inlet opening and comprises a circular wall terminating in a circular lip. When the safety cage is coupled with the air inlet opening, the circular lip is positioned immediately adjacent the at least one impeller blade to define an airflow path from the air inlet opening through the impeller that minimizes the flow of air from between the circular lip and the at least one impeller blade.

DESCRIPTION OF AN EMBODIMENT OF THE INVENTION

The invention comprises a riding debris mover which can be used to move debris, such as leaves, twigs, trash, snow, and the like, on a surface such as a lawn or paved area from a first location to a second location. The riding debris mover can move the debris through blowing or vacuuming as selected by an operator. The invention will be generally described with respect to a riding blower, although the debris mover can be coupled to a larger implement, such as a tractor, through a power takeoff assembly, and can be used in a vacuuming mode as hereinafter described.

Figure 1:
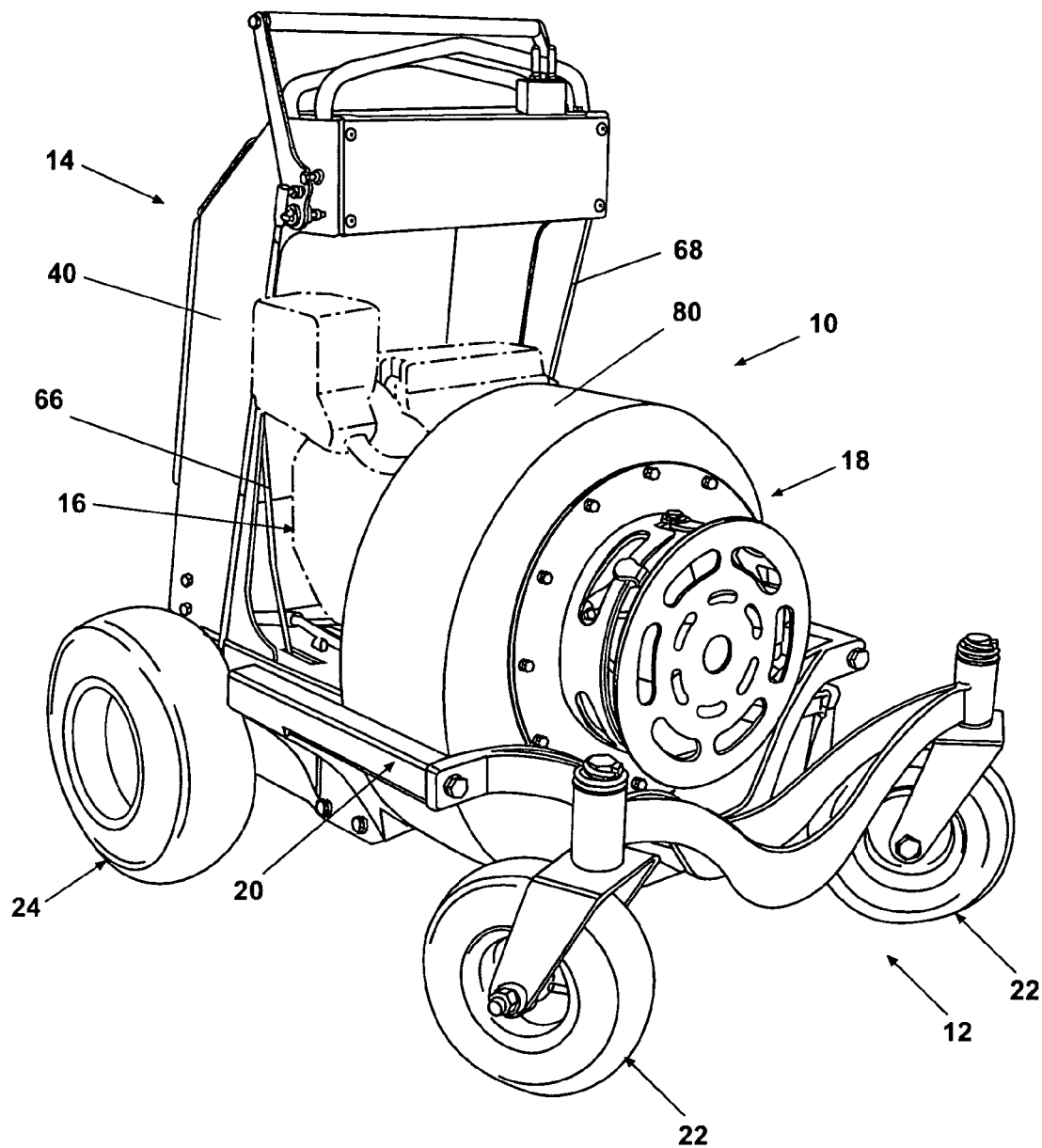
FIG. 1 is a front perspective view of an embodiment of the invention comprising a riding debris mover having a suspension assembly, a control assembly, a power assembly, and a blower assembly.
Figure 2:
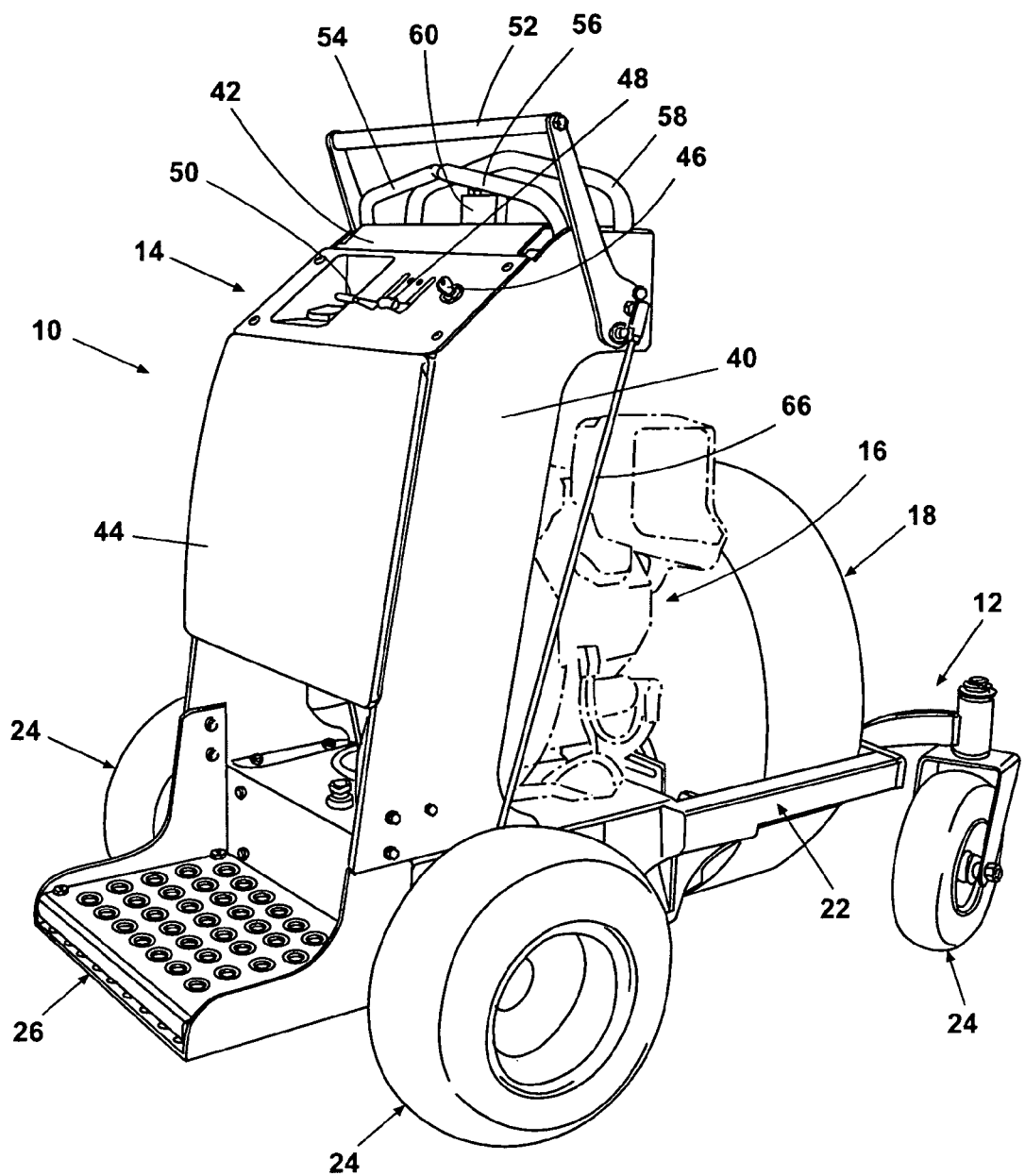
FIG. 2 is a rear perspective view of the riding debris mover illustrated in FIG. 1.
Figure 7:
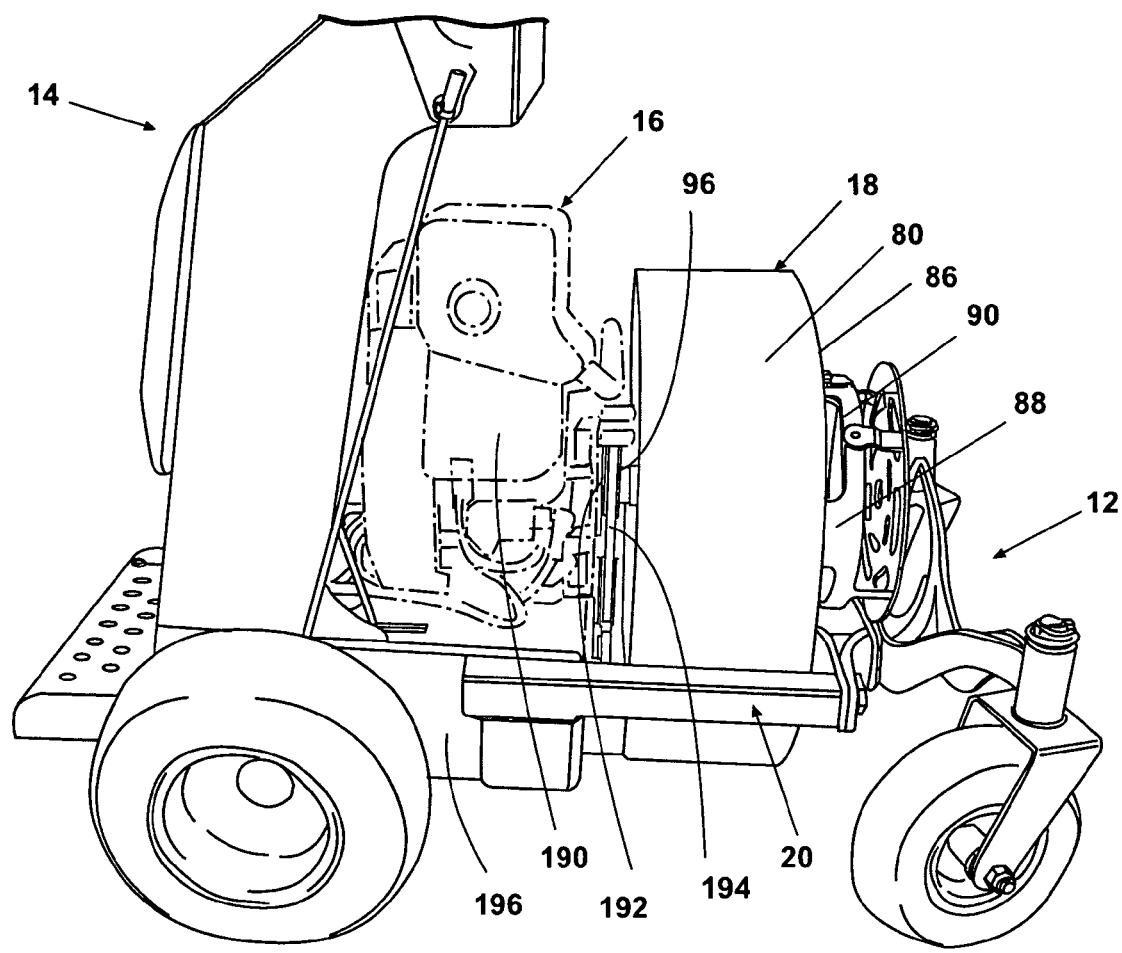
FIG. 7 is a side elevational view of the riding debris mover illustrated in FIG. 1.

A first embodiment of the invention comprising a dual-deflector riding blower 10 is illustrated in FIGS. 1, 2, and 7. The riding blower 10 comprises a suspension assembly 12, a control assembly 14, a power assembly 16, and a blower assembly 18.

The suspension assembly 12 generally comprises a chassis 196 and a frame 20 coupled to a pair of ground-engaging front wheels 22. The chassis 196 can comprise a portion of the frame assembly 12, and can be adapted to support the control pedestal 40 and support platform 26. Preferably, the chassis 196 is coupled to a pair of ground-engaging rear traction wheels 24 and supports the frame 20, the power assembly 16, and the blower assembly 18 for travel along a surface such as a lawn or a paved area. The chassis 196 also supports a user support platform 26 for supporting an operator during travel and operation of the blower 10. The frame 20 and chassis 196 can have any selected configuration suitable for integration of the wheels 22, 24 therewith and support of the control assembly 14, the power assembly 16, and the blower assembly 18. Accordingly, the frame 20 can be fabricated of a plurality of frame members having suitable dimensions, strength, and durability for the purposes described herein, and assembled into a finished configuration such as by welding, bolting, screwing, riveting, or a combination of such fastening techniques. The frame members can be fabricated of metal or plastic components that are stamped, molded, drawn, or extruded, as is known by one having ordinary skill in the art.

The chassis 196 is preferably adapted as a box-like receptacle for enclosing and supporting a hydraulic system (not shown) comprising a hydraulic pumps, hydraulic motors, hydraulic lines, a hydraulic reservoir, and the like. As hereinafter described, the rear traction wheels 24 are hydraulically operated by the hydraulic system enclosed in the chassis 196. Enclosing the hydraulic system in the chassis 196 provides protection to the components thereof and minimizes damage to the components, particularly hydraulic lines.

Figure 3:
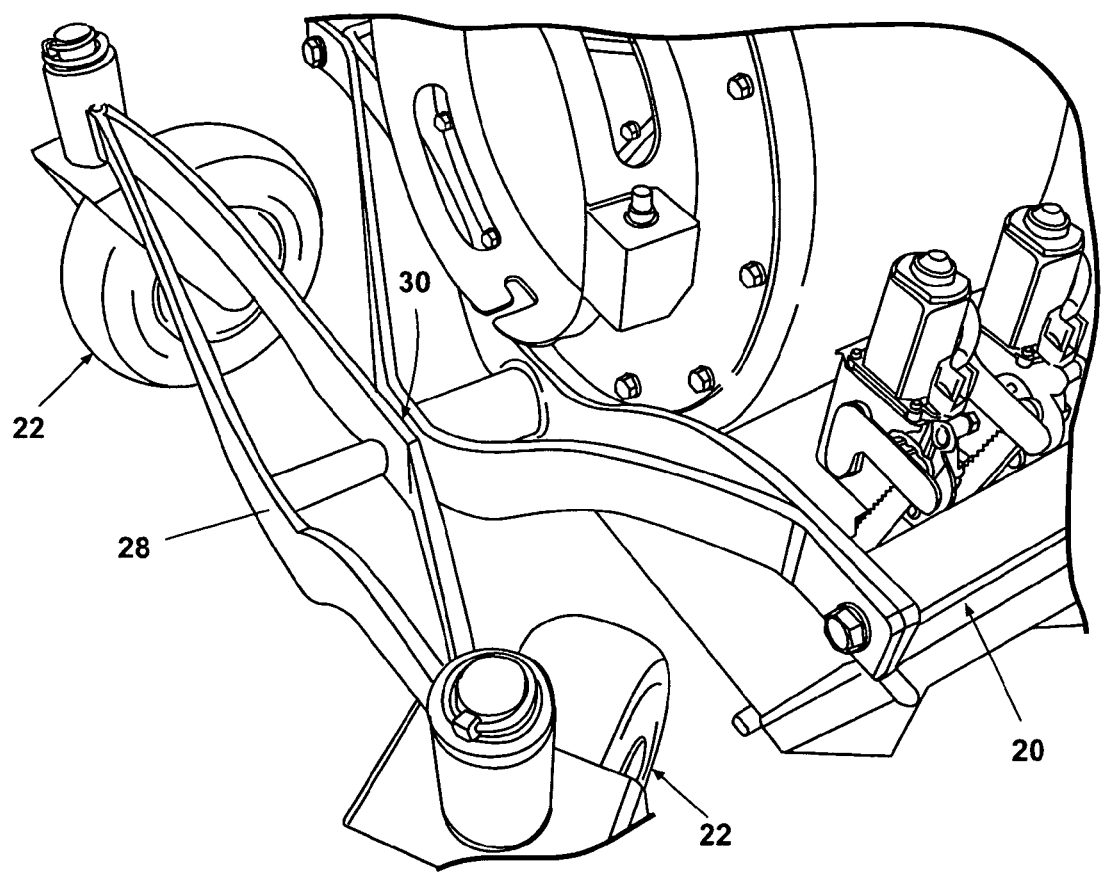
FIG. 3 is an enlarged front perspective view of a portion of the suspension assembly illustrated in FIG. 1.

The front wheels 22 can be fixed or steerable. Preferably, the front wheels 22 comprise caster wheels, which can provide zero turning radius (ZTR) capability. The front wheels 22 can also be attached to the frame 20 in a fixed planar orientation or, as illustrated in FIG. 3, coupled to a subframe 28 that is pivotally coupled to the frame 20 through a pivot coupling 30 for articulation about an axis that is generally parallel to the surface to be cleaned. Such a configuration enables the blower 10 to traverse an uneven surface, while maintaining the generally fixed orientation of the blower assembly 18 relative to the surface, thereby enhancing the effectiveness of the blower assembly 18, and reducing torque on the suspension assembly 12.

Figure 4:
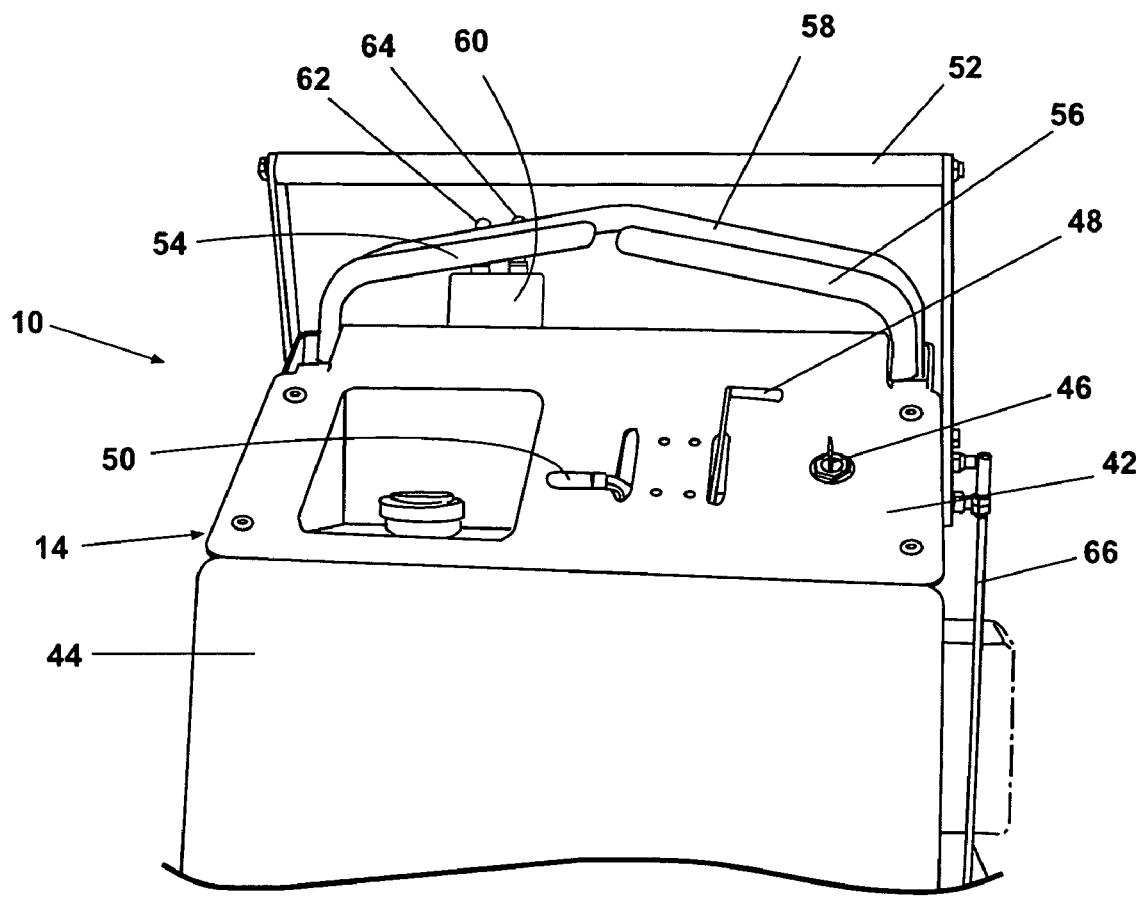
FIG. 4 is an enlarged rear perspective view of a portion of the control assembly illustrated in FIG. 1.
Figure 5:
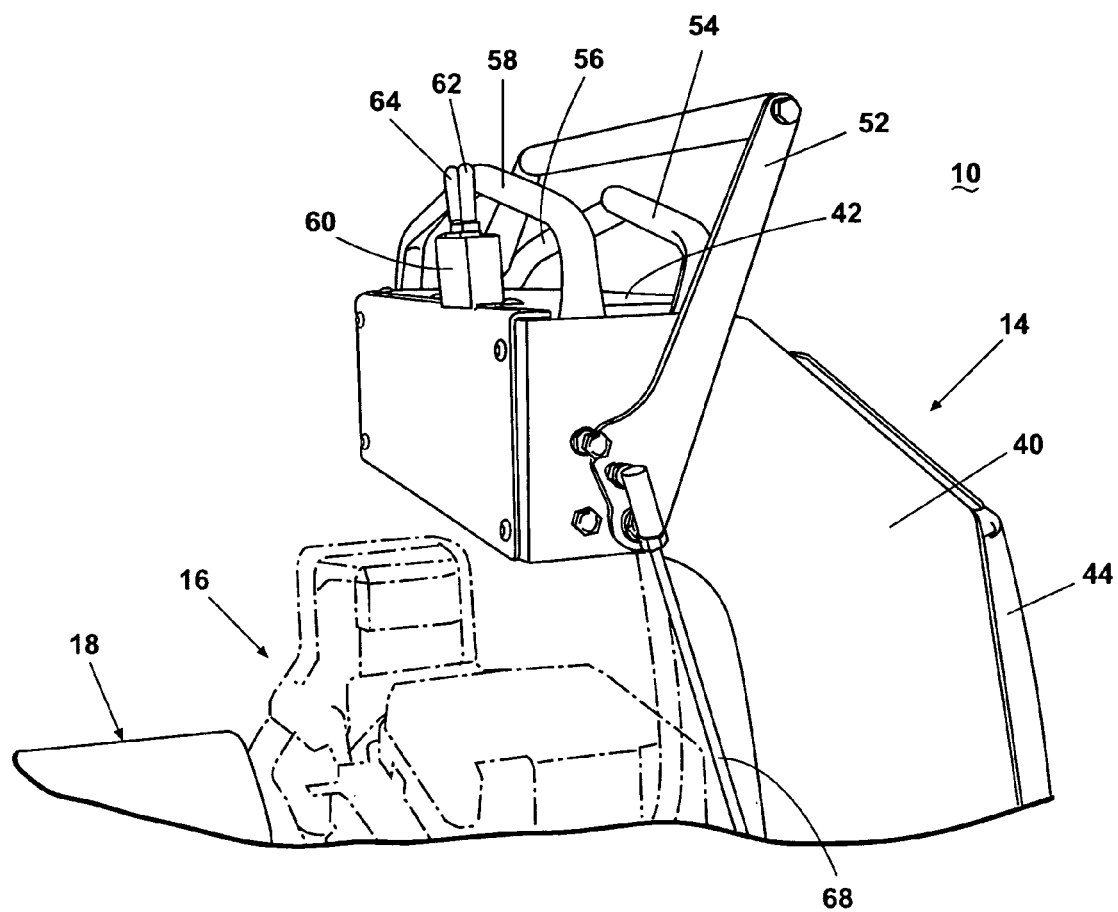
FIG. 5 is an enlarged side perspective view of a portion of the control assembly illustrated in FIG. 4.

Referring also to FIGS. 4 and 5, the control assembly 14 comprises a control pedestal 40 supported upon, and extending upwardly from, the chassis 196 at a rear portion of the blower 10. The control pedestal 40 comprises a control panel 42 at an upper portion thereof, and an operator cushion 44 extending along a rear portion thereof above the support platform 26, against which an operator can rest while operating the blower 10. Referring specifically to FIG. 4, the control panel 42 accommodates several controls for operating the blower 10, such as an ignition switch 46 operatively coupled with the power assembly 16, and a deflector control assembly 60. The deflector control assembly 60 is utilized to control air flow from the blower assembly 18, as hereinafter described.

Referring also to FIG. 5, the control pedestal 40 includes a brake lock 52, a pair of drive wheel hydraulic control levers 54, 56, and a hand rest 58. The brake lock 52 comprises a handlebar rigidly attached to a pair of pivot arms which are pivotally attached to the control pedestal 40 through an over-center connection. Each pivot arm is pivotally connected to a brake lock rod 66, 68 which is operably coupled to a drum brake in each rear traction wheel 24 to serve as a parking brake and, as necessary, emergency brakes for the rear traction wheels 24. Moving the brake lock 52 to a forward position releases the rear traction wheel brakes 24. Conversely, moving the brake lock 52 to a rearward position, as illustrated in FIG. 5, sets the rear traction wheel brakes 24. When the brake lock 52 is in the rearward position, it is positioned relative to the control levers 54, 56 so that the brake lock 52 must be moved forward to the release position in order to conveniently operate the control levers 54, 56, thereby ensuring that the brakes are released prior to attempting to drive the blower 10. The over-center connection maintains the brake lock 52 in either the release position or set position selected by the operator. Preferably, the brakes comprise drum brakes, although other types of wheel brakes can be employed as are well-known to a person of ordinary skill in the art.

Each hydraulic control lever 54, 56 is operably coupled to a hydraulic pump (not shown) in a manner well-known to a person of ordinary skill in the art for operating the hydraulic pump and an associated hydraulic motor for driving one of the traction wheels 24. For example, activation of the left drive wheel hydraulic control lever 54 will control the hydraulic power delivered to the left rear traction wheel. Similarly, activation of the right drive wheel hydraulic control lever 64 will control the hydraulic power delivered to the right rear traction wheel. The hydraulic system is configured so that pushing the control levers 54, 56 toward the front of the blower 10 will result in the blower 10 moving forward. Conversely, pulling the control levers 54, 56 toward the rear of the blower 10 will result in the blower 10 moving rearward. Additionally, moving one control lever forward and the other control lever rearward will result in the blower 10 being selectively pivoted to a left or right direction, thereby enabling the blower tend to be steered. Furthermore, the degree of movement of the control levers 54, 56 is directly proportional to the speed of the traction wheels 24. Thus, moving the control levers 54, 56 a slight distance will move the blower 10 at a slow speed. Moving the control levers 54, 56 to the limit of their travel will move the blower 10 at a maximum speed. Moreover, the left control lever 54 and right control lever 56 can be selectively operated to provide greater hydraulic power to the left rear traction wheel than to the right rear traction wheel, thereby causing the left rear traction wheel to rotate at a higher angular velocity, and moving the blower 10 to the right. Accordingly, the operation of the drive wheel hydraulic control levers 54, 56 can provide precise directional and velocity control of the blower 10. The hand rest 58 comprises a stationary bar extending generally upwardly from the top of the control pedestal 40 to assist in operating the control levers 54, 56. Specifically, the hydraulic control levers 54, 56 can be operated by a squeezing motion using the hand rest 58 two propel the blower 10 in a forward direction. Accordingly, to operate the traction wheels 24, the control levers 54, 56 are squeezed against the hand rest 58.

The control pedestal 40 is also provided with a deflector control assembly 60 having a pair of control levers 62, 64 for controlling the operation of a deflector assembly 120, as hereinafter described. A throttle 48 and a choke 50 can also be incorporated into the control pedestal 40 for operation of an internal combustion engine comprising the power assembly 16.

Figure 6:
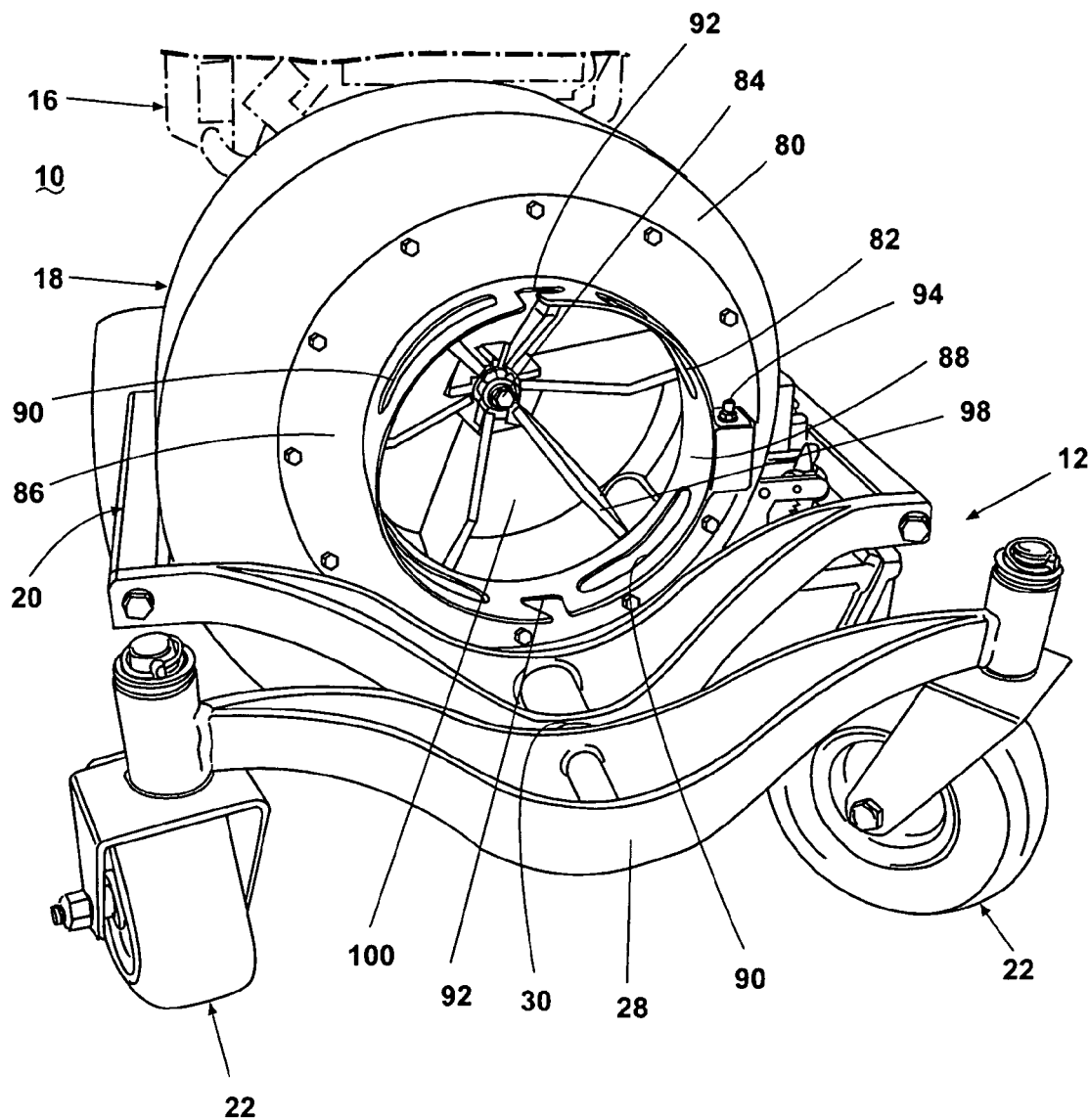
FIG. 6 is an enlarged front perspective view of the riding debris mover illustrated in FIG. 1 showing the blower assembly.
Figure 8:
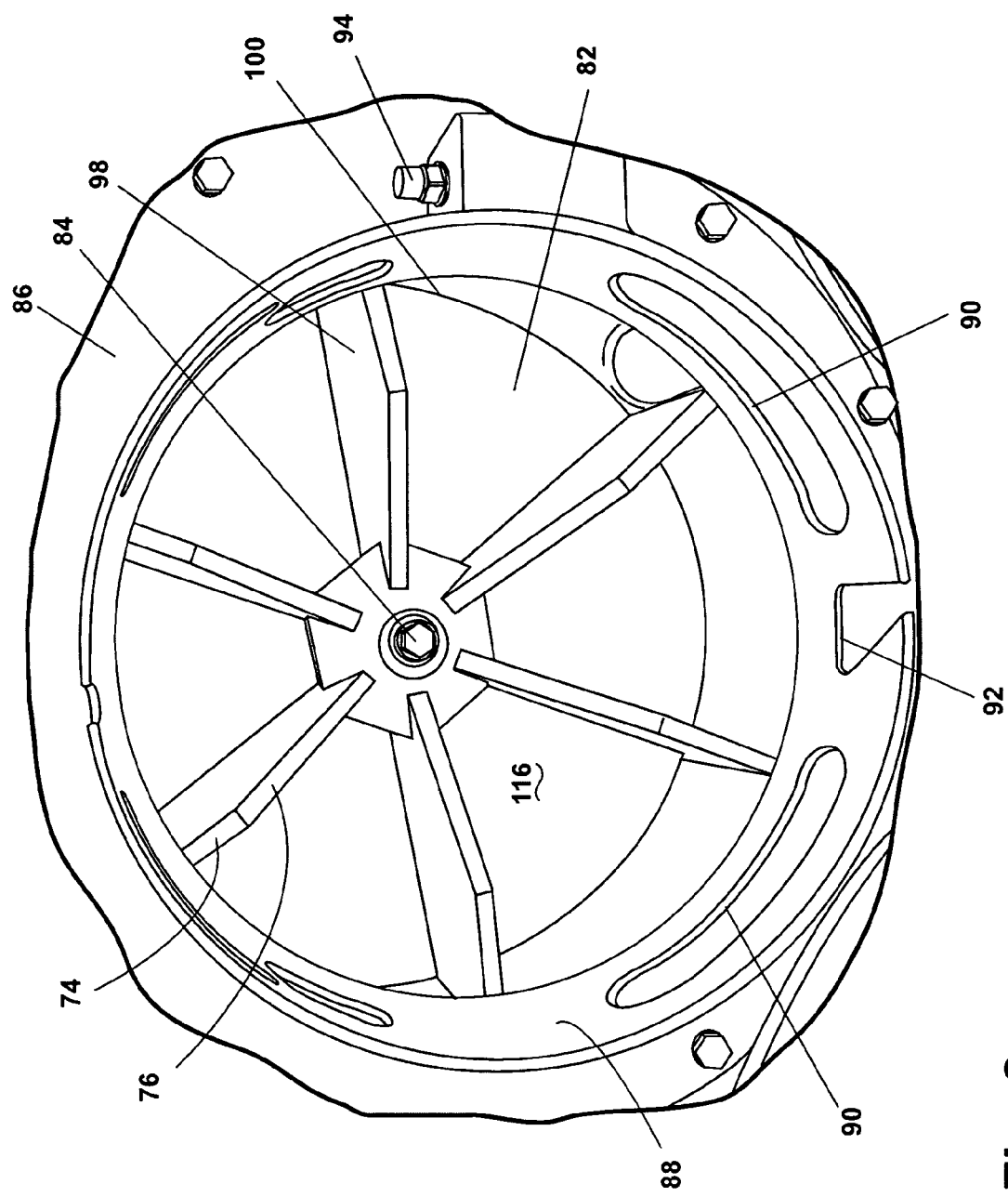
FIG. 8 is an enlarged front perspective view of a portion of the blower assembly illustrated in FIG. 6 showing an air inlet opening and an impeller.

FIGS. 6-8 illustrate the blower assembly 18, which comprises a blower housing 80, which can be incorporated into the structure of the frame 20 or can be separate from the frame 20, enclosing an impeller 82 operatively coupled with the power assembly 16 through a locking bolt 84. Although an axial flow blower may be used, the blower assembly 18 will preferably comprise a centrifugal or "squirrel cage" configuration. A deflector assembly 120 is defined on the blower housing 80 for emission of the stream of air that is generated by the blower assembly 18. In the embodiment illustrated, the blower assembly 18 is positioned at a location toward the front of the blower 10 or at least forward of the support platform 26. The blower assembly 18 is adapted to provide a stream of air having an air flow of between 4000 and 5000 cfm when rotated by a power source operating at a design operating speed, as hereinafter described. The blower housing 80 comprises a generally hollow, cylindrical shell having an annular front wall 86 terminating in an axially outwardly extending, ring-like circular flange 88 defining an opening 116 into the interior of the blower housing 80. The flange 88 is provided with a plurality of inlet openings 90, which are illustrated as having a generally oval, slot-like configuration. However, other configurations, such as rectilinear, circular, and the like, can be utilized. The flange 88 is also provided with a pair of generally L-shaped, diametrically opposed, lock slots 92 opening to the front of the blower 10. Attached to the flange 88 along an outer portion thereof is an electric cutoff switch 94, which is preferably a push-button style switch, operable in a direction tangential to the flange 88.

The impeller 82 is a generally circular body comprising a plurality of radially-disposed impeller blades 98 attached to a circular impeller plate 100. The impeller blades 98 have a somewhat wedge-shaped profile with an inclined edge 74 extending generally from the center of the impeller plate 100 to a forward edge 76 extending parallel to the impeller plate 100 from the inclined edge 74 to the circumference of the impeller plate 100. In the embodiment illustrated, the impeller plate 100 is fixedly attached to a crankshaft (not shown) of an internal combustion engine 190 (FIG. 7) by the locking bolt 84 for rotation with the crankshaft. As the impeller 82 is rotated, air is drawn into the blower housing 80 through the opening 116.

Figure 9:
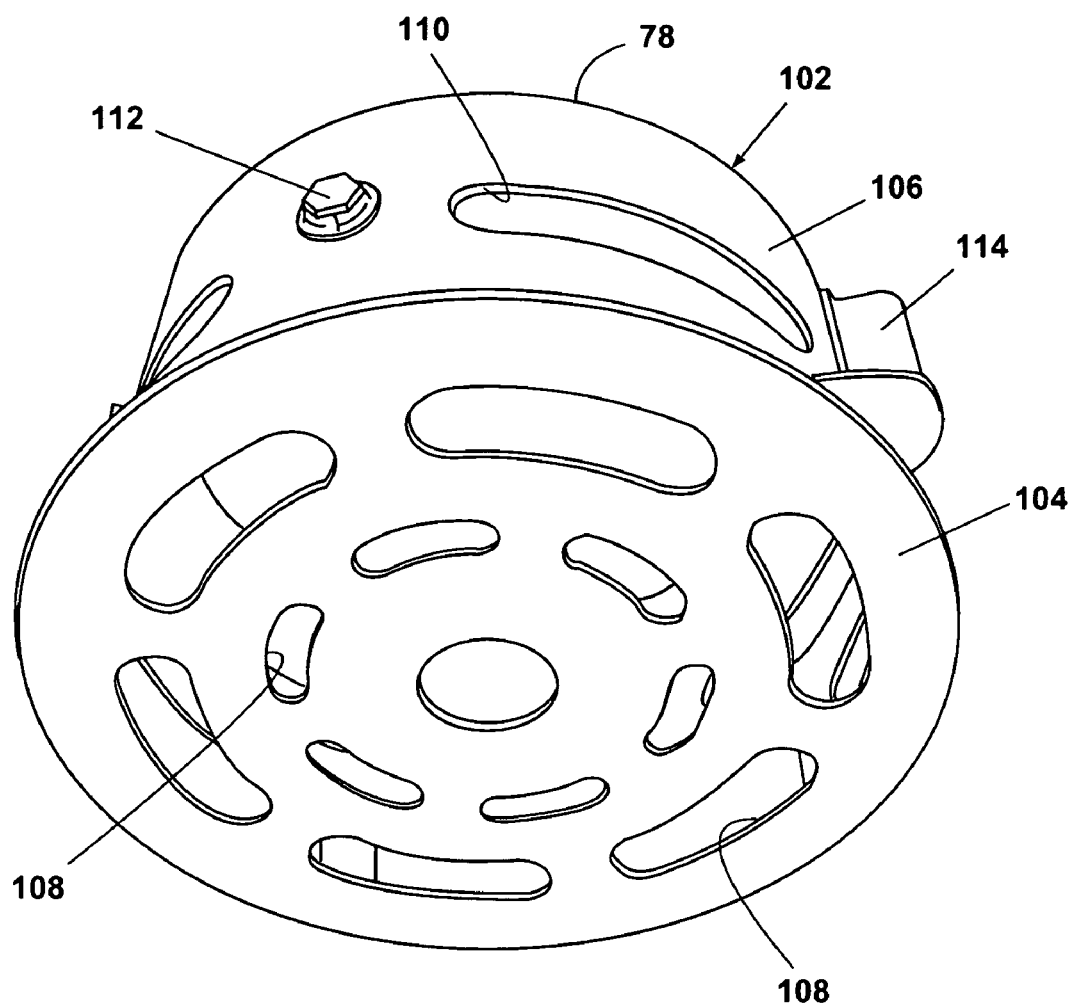
FIG. 9 is an enlarged front perspective view of a safety cage comprising a portion of the blower assembly illustrated in FIG. 1.
Figure 10:
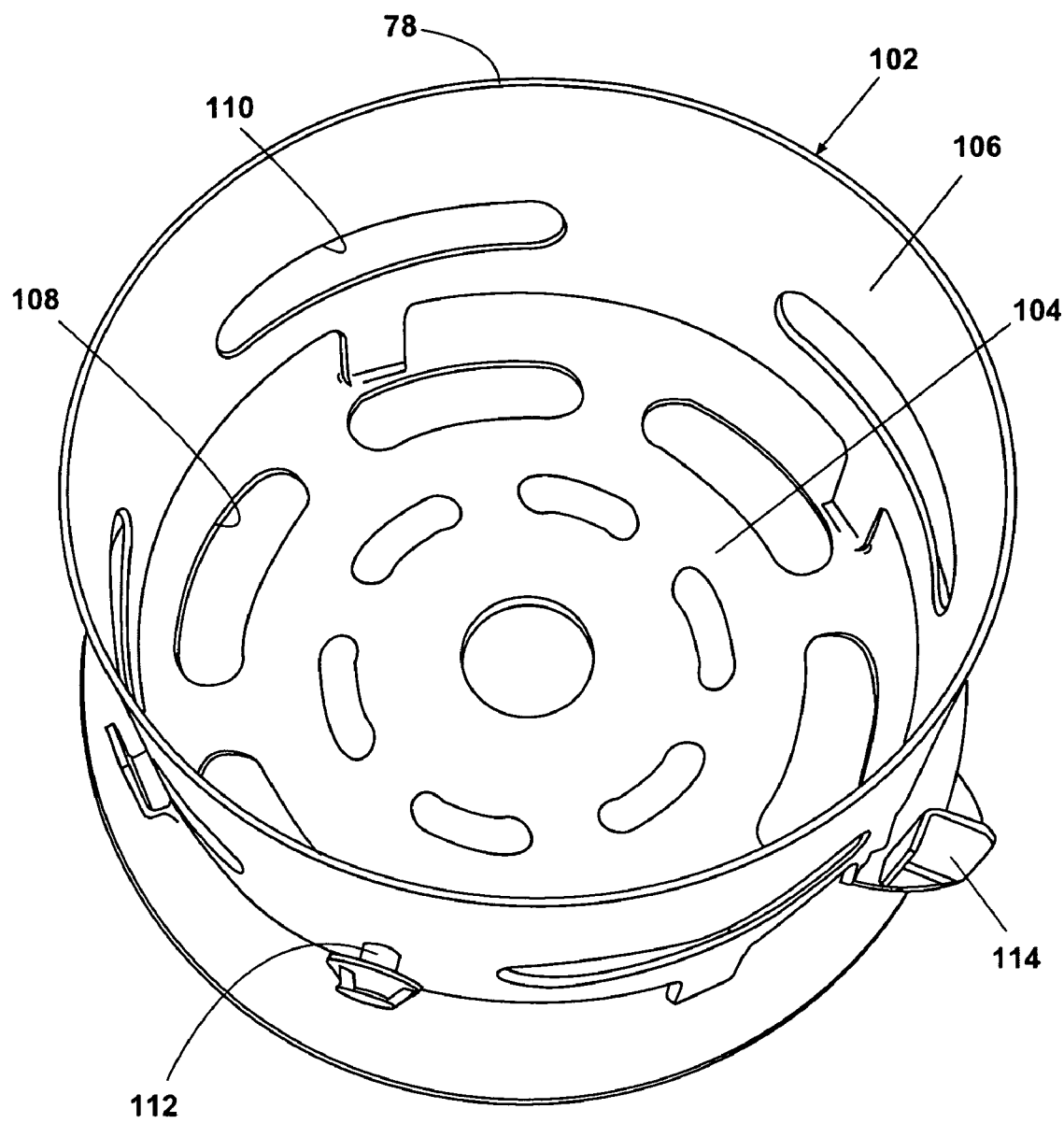
FIG. 10 is an enlarged rear perspective view of a safety cage comprising a portion of the blower assembly illustrated in FIG. 1.
Figure 11:
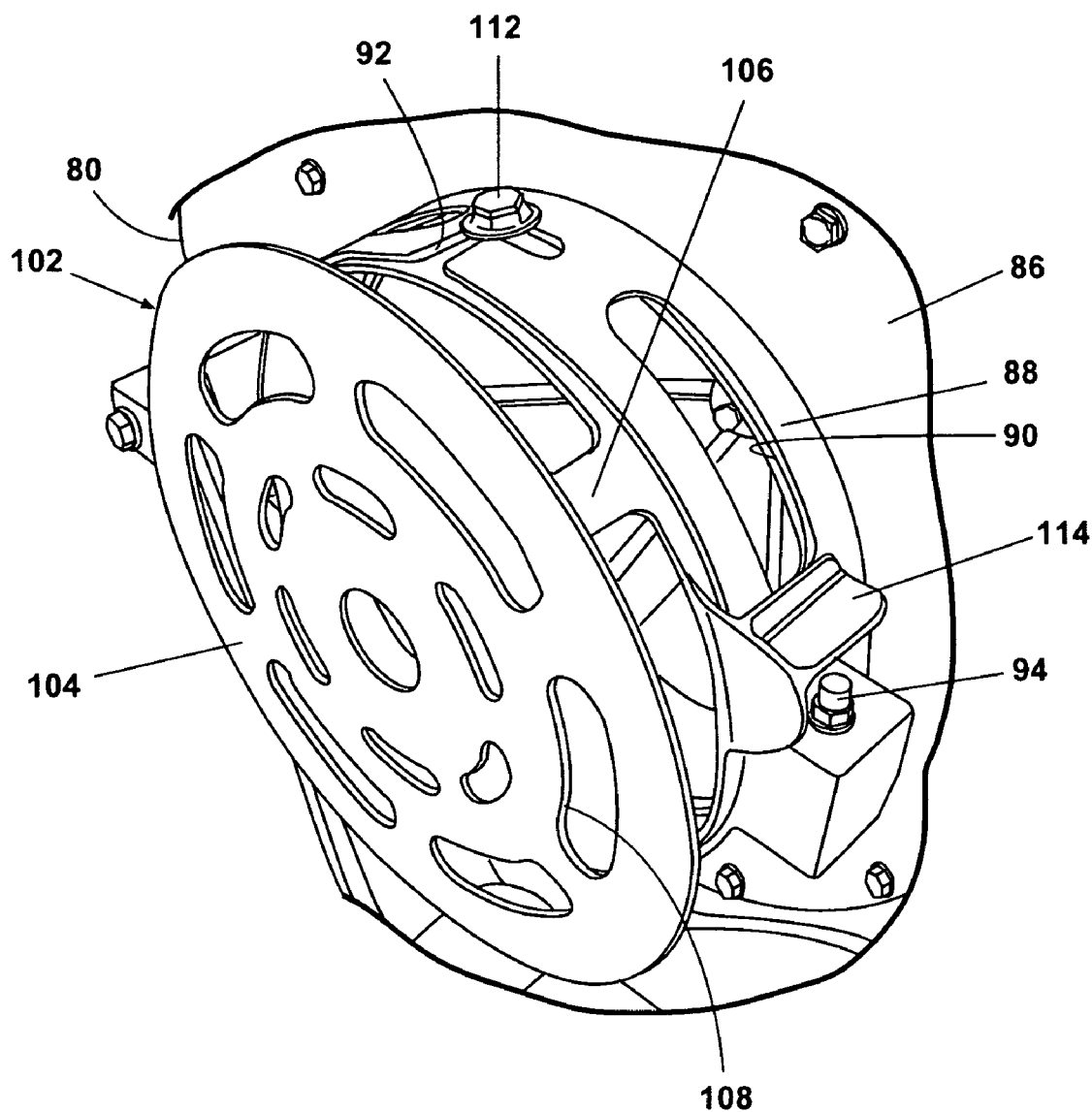
FIG. 11 is an enlarged front perspective view of the safety cage partially installed in the air inlet opening illustrated in FIG. 8.
Figure 12:
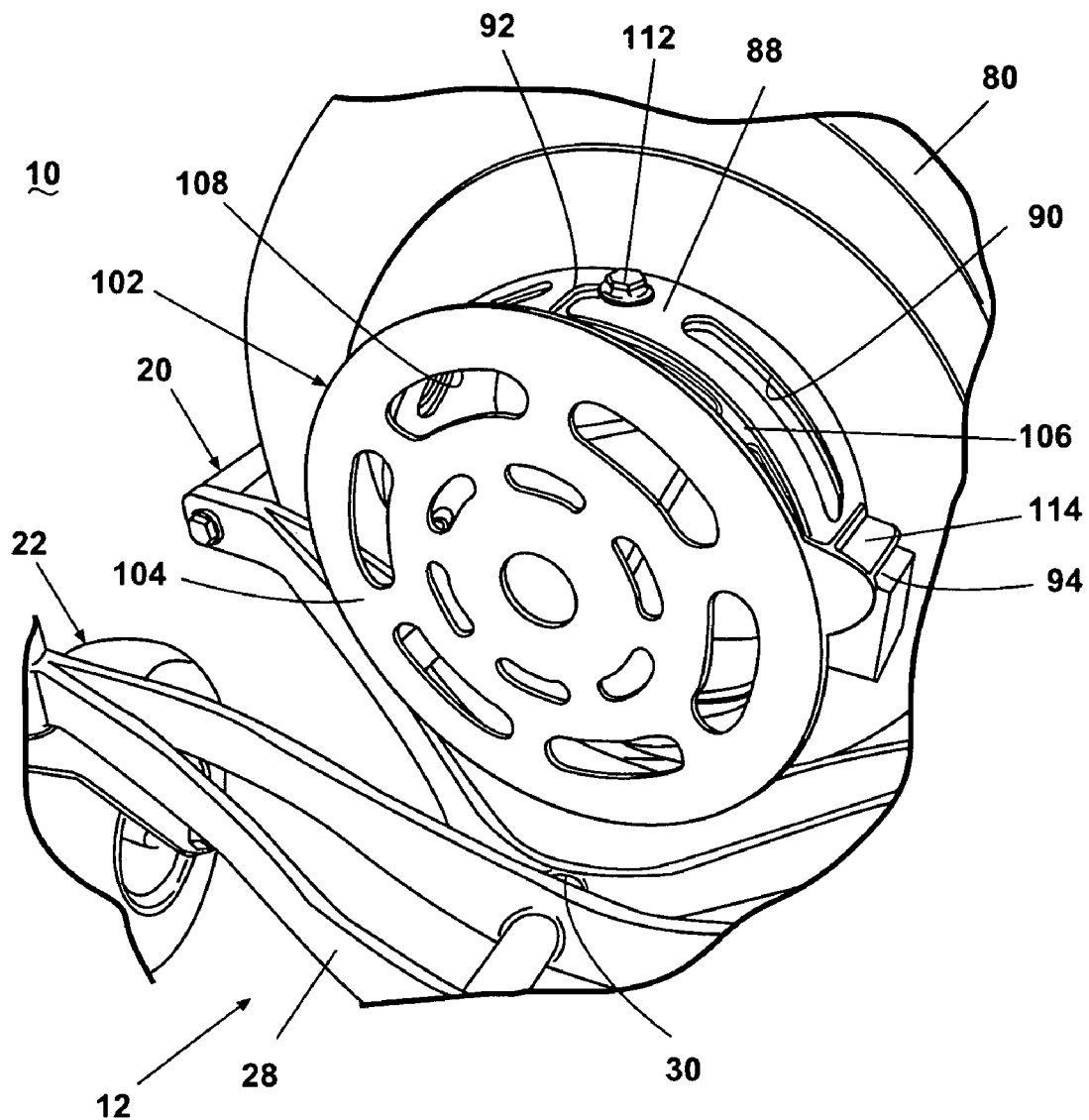
FIG. 12 is an enlarged front perspective view of the safety cage fully installed in the air inlet opening illustrated in FIG. 8.

As illustrated in FIGS. 1, 11, and 12, a safety cage 102 can be removably attached to the flange 88 to cover the opening 116 during operation of the blower 10 while allowing air to flow through the opening 116. As illustrated in FIGS. 9 and 10, the cage 102 comprises a circular plate-like forward wall 104 and a circular wall 106 terminating in a top lip 78. The top wall 106 is rigidly attached coaxially and generally orthogonally to the forward wall 104 near the circumference of the forward wall 104. The forward wall 104 is provided with a plurality of inlet openings 108, which are generally illustrated as arcuate, slot-like penetrations, but which can have other suitable configurations.

The circular wall 106 is adapted for slidable insertion within the flange 88 and, accordingly, has a diameter somewhat less than the diameter of the flange 88. The circular wall 106 has a height such that, when received within the flange 88 as hereinafter described, the top lip 78 of the circular wall 106 will be positioned immediately adjacent the forward edges 76 of the impeller blades 98. The circular wall 106 is provided with a plurality of inlet openings 110 having a configuration adapted to match the configuration of the inlet openings 90 in the flange 88. Extending radially outwardly from the circular wall 106 is a pair of diametrically-opposed lock bosses 112, adapted for slidable insertion into the lock slots 92 to define a bayonet connection for coupling the safety cage 102 to the flange 88. Fixedly attached to and extending radially outwardly away from the circular wall 106 is an activator plate 114 which is adapted to engage the cutoff switch 94 when the safety cage 102 is coupled to the flange 88. The activator plate 114 is a generally platelike member rigidly attached to the circular wall 106, such as by welding, and can be strengthened by suitable bracing.

As illustrated in FIG. 11, the circular wall 106 is adapted for slidable insertion into the opening 116 along the interior of the flange 88. To attach the safety cage 102 to the flange 88, the safety cage 102 is first positioned so that the lock bosses 112 are in registry with the lock slots 92 and the activator plate 114 is adjacent the cutoff switch 94. The safety cage 102 is then axially inserted into the opening 116 and rotated so that the lock bosses 112 are received fully within the lock slots 92, and the activator plate 114 engages the cutoff switch 94. As illustrated, the rotation of the safety cage 102 is clockwise. However, rotation can also be counterclockwise, with the activator plate 114 and cutoff switch 94 positioned accordingly. The cutoff switch 94 is adapted so that depression of the switch by the activator plate 114 closes an electrical circuit which enables the power assembly 16 to be operated. Removal of the safety cage 102 will release the cutoff switch 94, thereby opening a circuit and preventing operation of the power assembly 16.

The safety cage 102 is adapted so that the top lip 78 of the circular wall 106 is immediately adjacent the forward edges 76 of the impeller blades 98. Accordingly, minimal space exists between the top lip 78 and the forward edges 76, which ensures that the air drawn through the opening 116 is immediately drawn by the impeller blades 98 into rotational movement to exit the blower outlet opening 123. The proximity of the top lip 78 to the forward edges 76 reduces the potential for air to escape laterally from between the top lip 78 and the forward edges 76, also referred to as "blow by," which can result from an excessive air space between the circular wall 106 and the impeller blades 98. Minimizing "blow by" enhances the effectiveness of the blower assembly 18 by maximizing the velocity and air flow of the air stream exiting the blower assembly 18.

Figure 13:
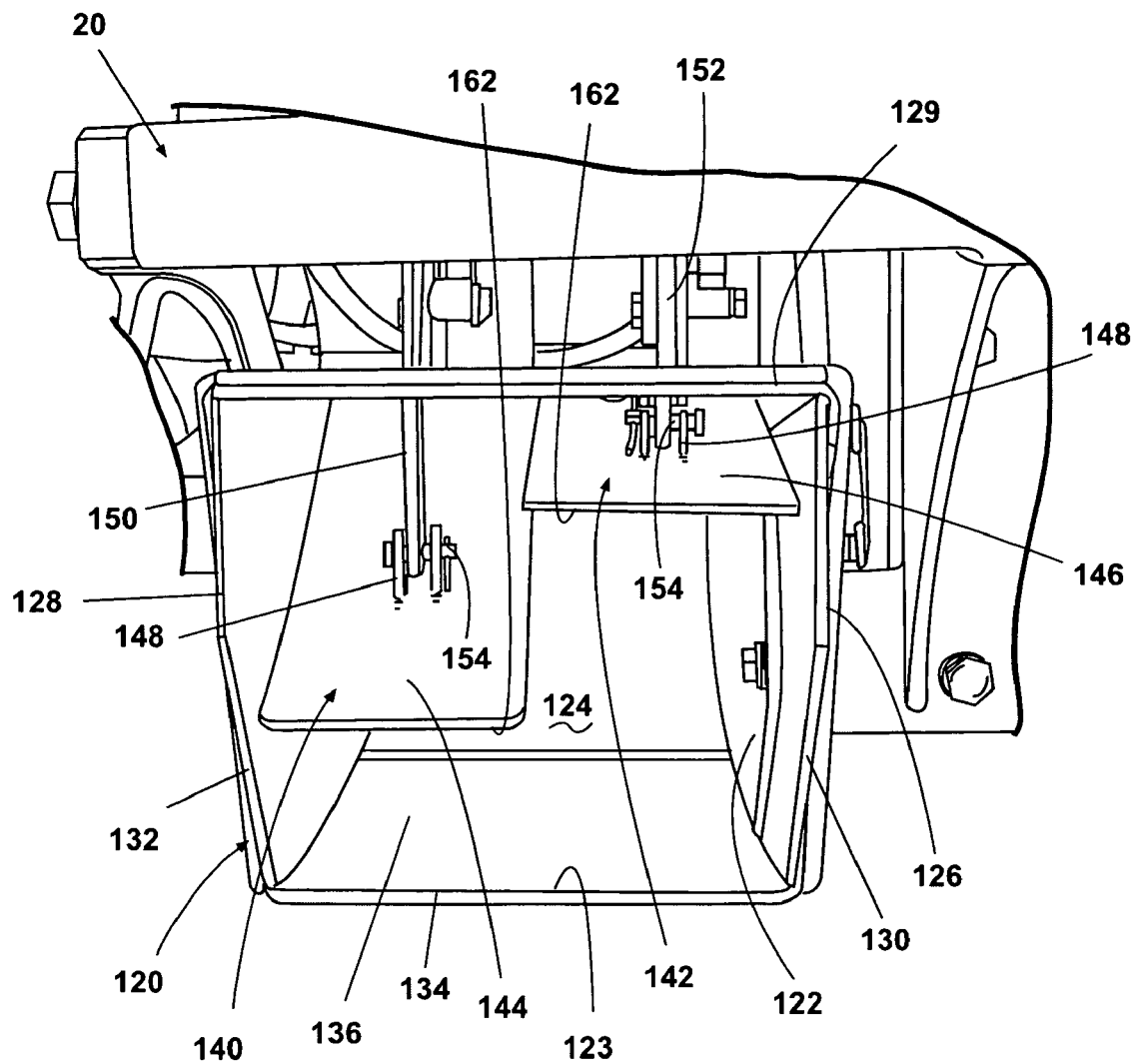
FIG. 13 is an enlarged perspective view of a deflector assembly comprising a portion of the blower assembly illustrated in FIG. 1.
Figure 14:
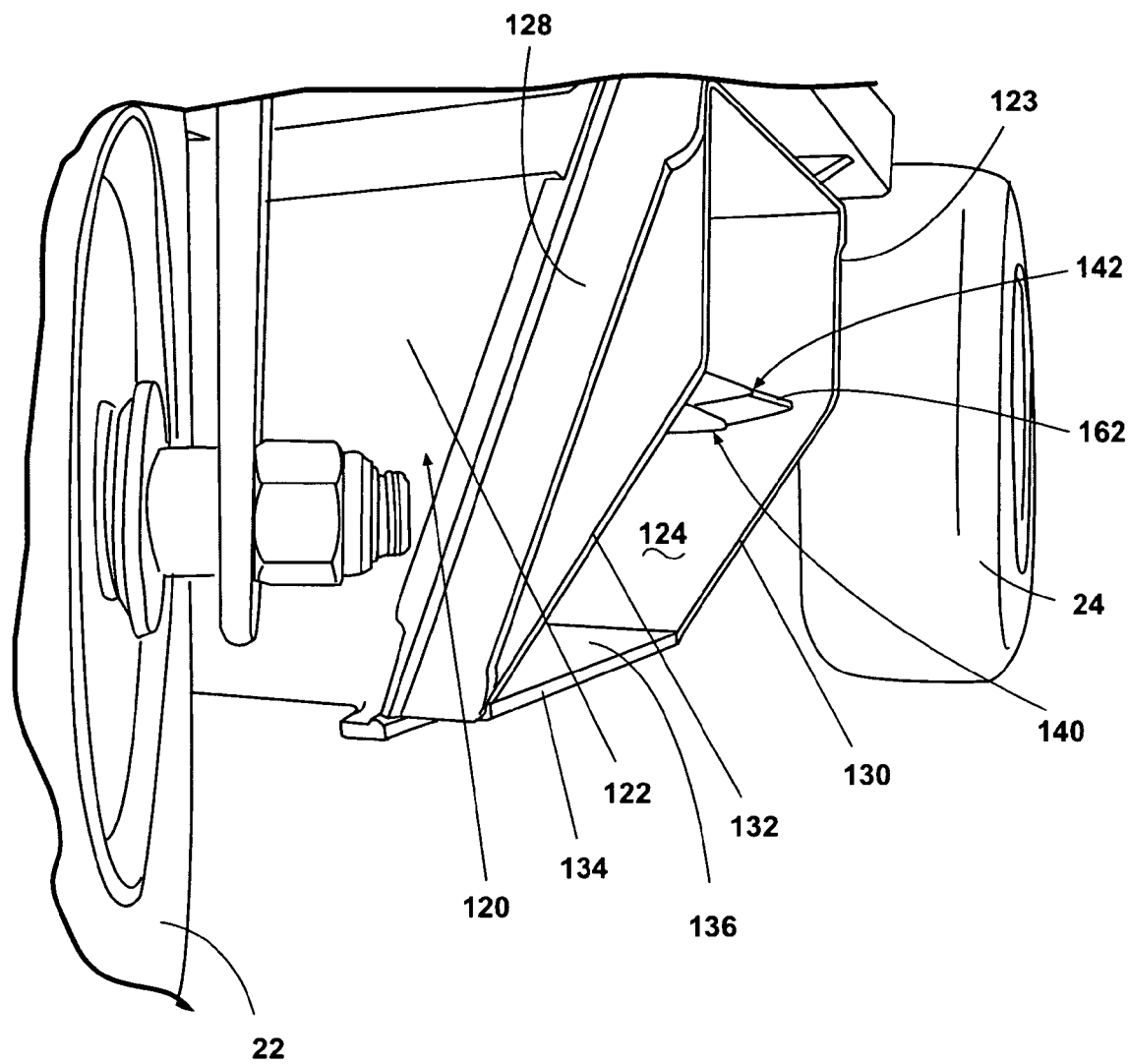
FIG. 14 is an alternate enlarged perspective view of the deflector assembly illustrated in FIG. 13.

Referring now to FIG. 13, the blower housing 80 terminates in a deflector assembly 120 extending tangentially away from a lower portion of the blower housing 80, and fluidly communicating with the interior of the housing 80 and the opening 116. The deflector assembly 120 comprises an outlet chute 122 terminating in a blower opening 123, and defining an outlet chamber 124. The outlet chute 122 comprises a pair of side walls 126, 128, a top wall 129, and a bottom wall 136 defining a generally rectilinear cross-section. Each side wall 126, 128 terminates in a side wall lip 130, 132, respectively, and the bottom wall 136 terminates in a bottom wall lip 134. As illustrated in FIG. 14, the sidewall lips 130, 132 are inclined inwardly to the bottom wall lip 134 over at least a portion of their length.

Figure 15:
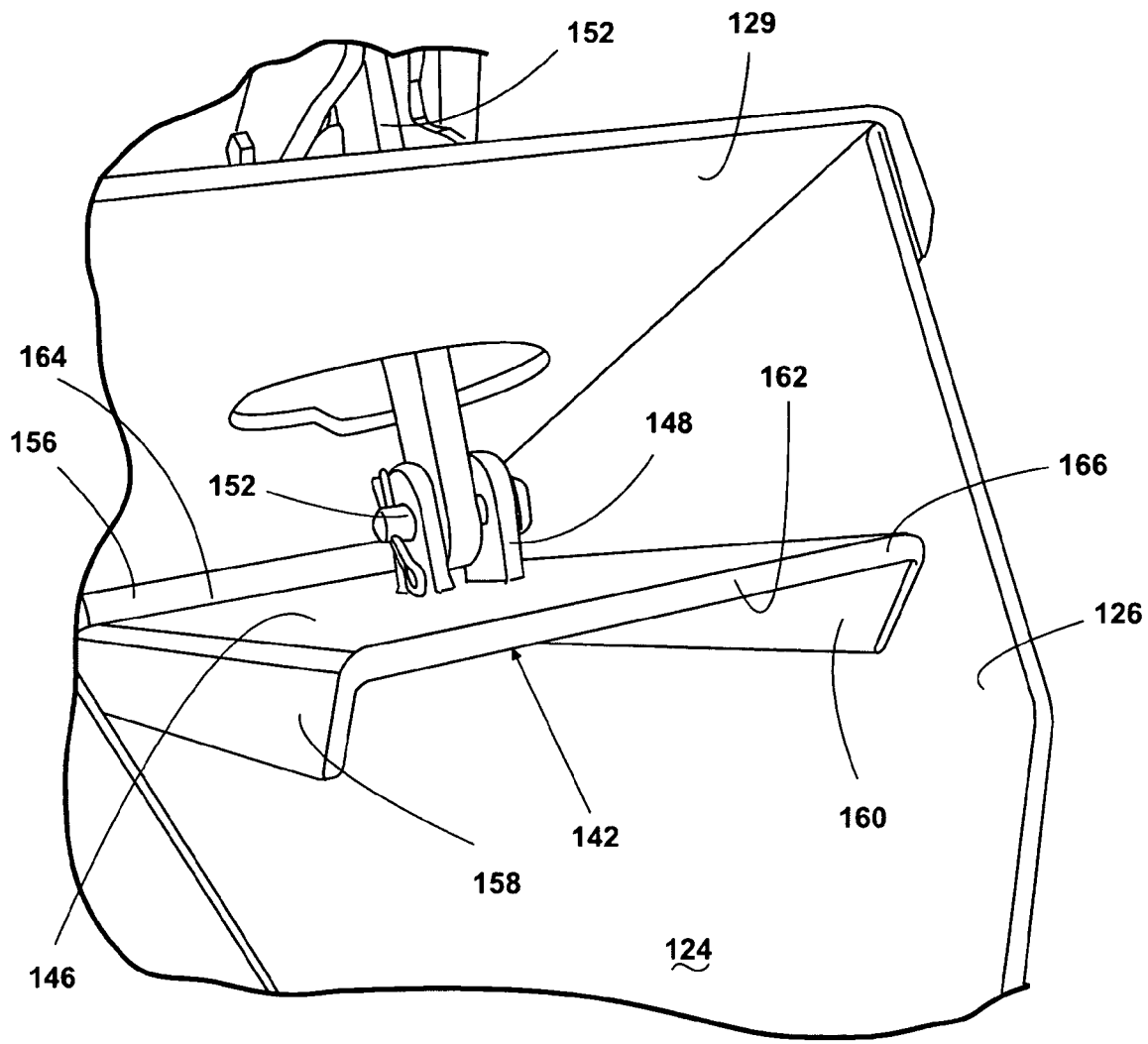
FIG. 15 is an enlarged perspective view of the deflector assembly illustrated in FIG. 13 showing a deflector and a portion of a control mechanism for the deflector.
Figure 16:
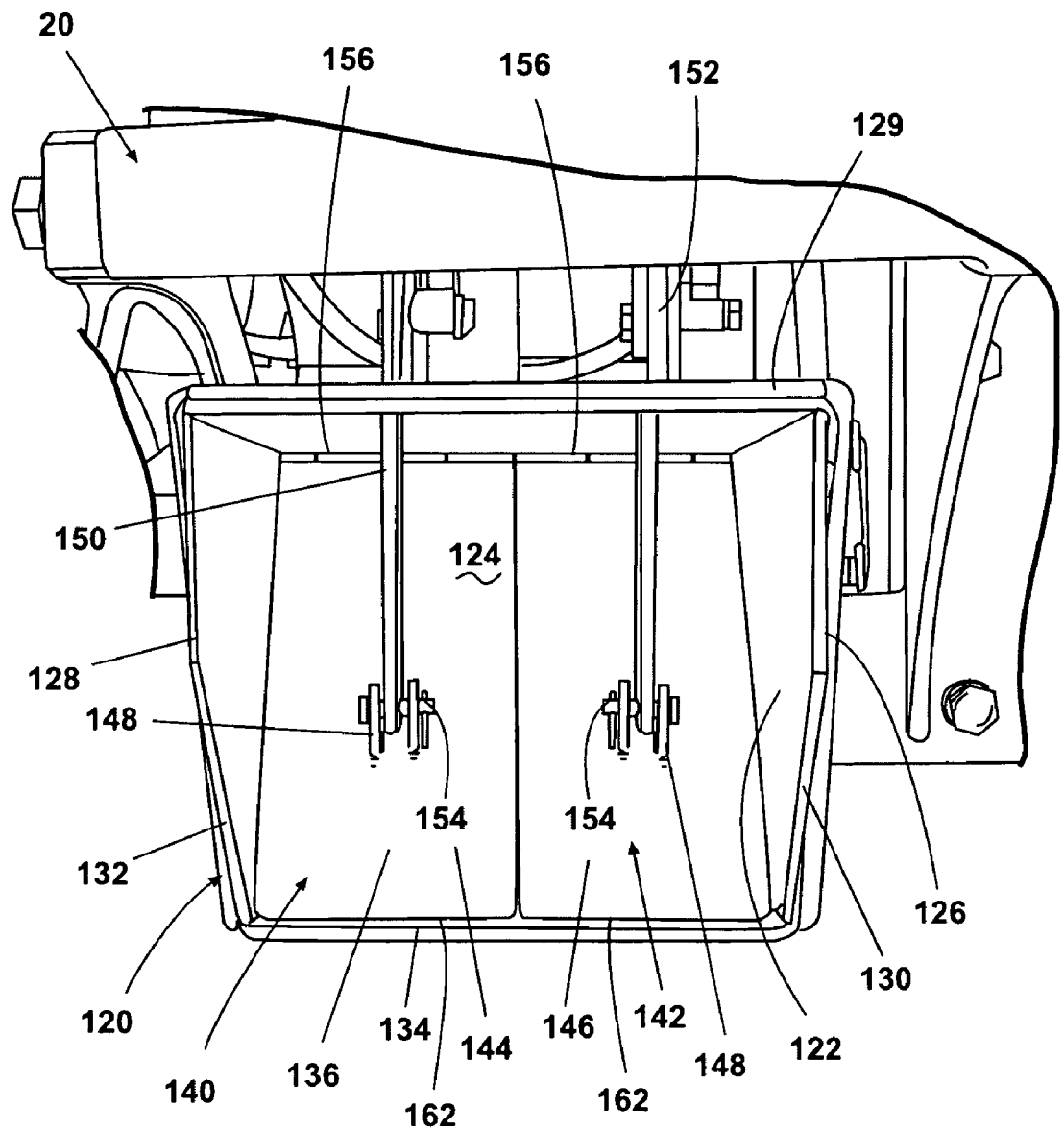
FIG. 16 is an enlarged perspective view of the deflector assembly illustrated in FIG. 13 showing the deflector is in a closed position.

As illustrated also in FIG. 15, the outlet chamber 124 encloses a pair of deflectors 140, 142 comprising a pair of planar, generally rectilinear deflector plates 144, 146, respectively, having an inner edge 164 and an opposed outer edge 166. The deflector plate 144, 146 can be provided with a pair of downwardly depending flanges 158, 160 extending along opposed longitudinal edges of the deflector plate 144, 146. The outer edge 166 of the deflector plate 144, 146 comprises a beveled edge 162. The inner edge 164 is hingedly attached to the top wall 129 of the outlet chute 122. A hinge 156 extends along the inner edge 164 of the deflector plate 144, 146 to rotatably attach the deflector plate 144, 146 to the top wall 129 of the outlet chute 122. Accordingly, the deflector plate 144, 146 can be rotated about the hinge 156 between an open position, as illustrated in FIG. 13, and a closed position, as illustrated in FIG. 16.

As illustrated in FIGS. 13 and 15, each deflector plate 144, 146, is provided with a clevis 148 rigidly attached to and extending generally orthogonally away from the top of the deflector plate 144, 146 toward the outer edge 166. An actuator arm 150, 152 is an elongated, generally rectilinear member having a plurality of gear teeth 182 extending along one longitudinal edge, and adapted with an aperture for pivotal coupling to the clevis 148. The deflector plate 144, 146 is pivotally attached to an actuator arm 150, 152 by a pin 154 extending through the actuator arm 150, 152 and the clevis 148. The actuator arm 150, 152 extends upwardly away from the clevis 148 through a suitable aperture in the top wall 129. As illustrated in FIG. 13, the deflector plate 144, 146 can be moved from a completely open position, to a partially open position, through movement of the actuator arm 150, 152.

Figure 17:
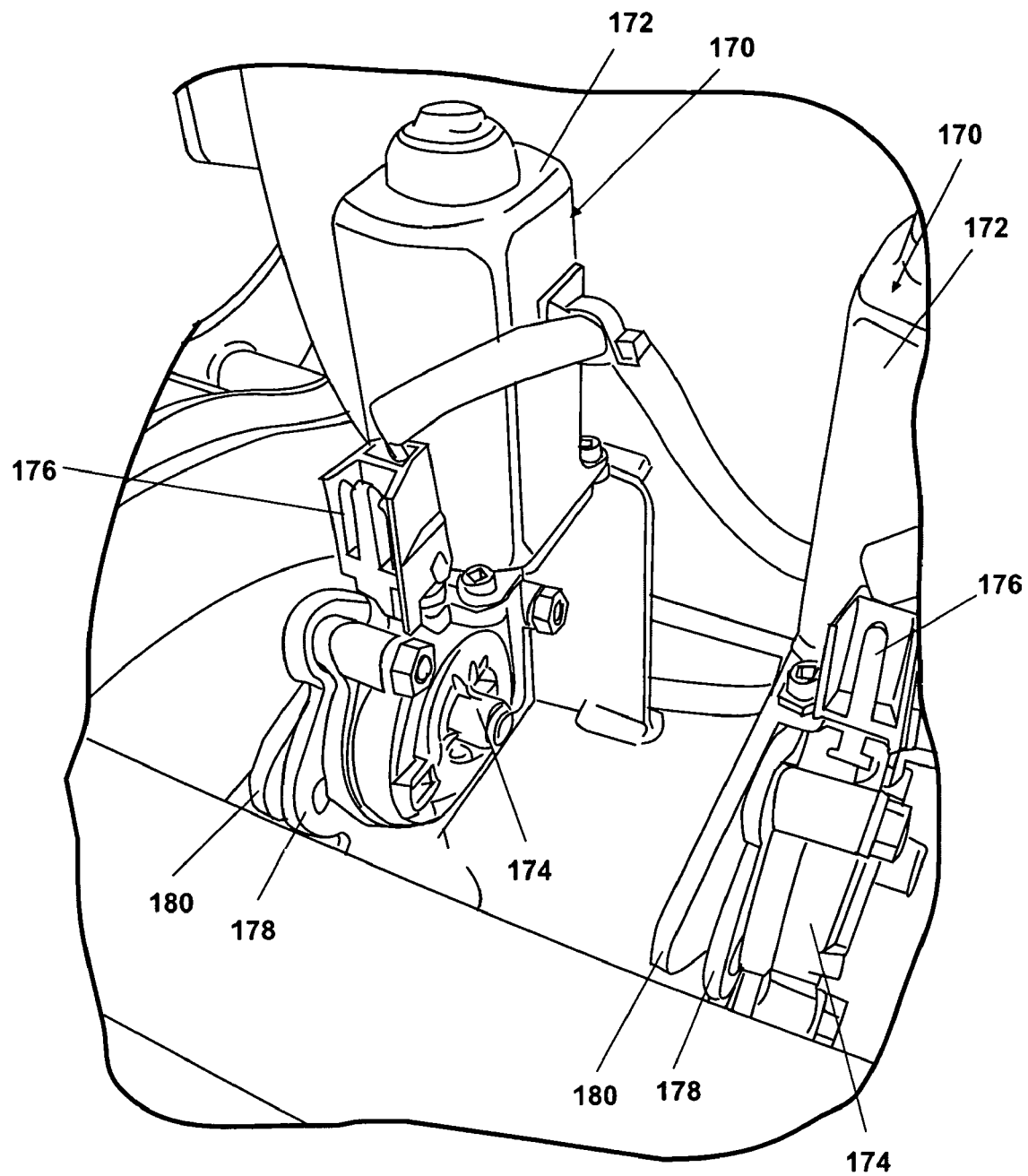
FIG. 17 is an enlarged perspective view of an actuator assembly for controlling the operation of the deflector assembly illustrated in FIG. 13.
Figure 18:
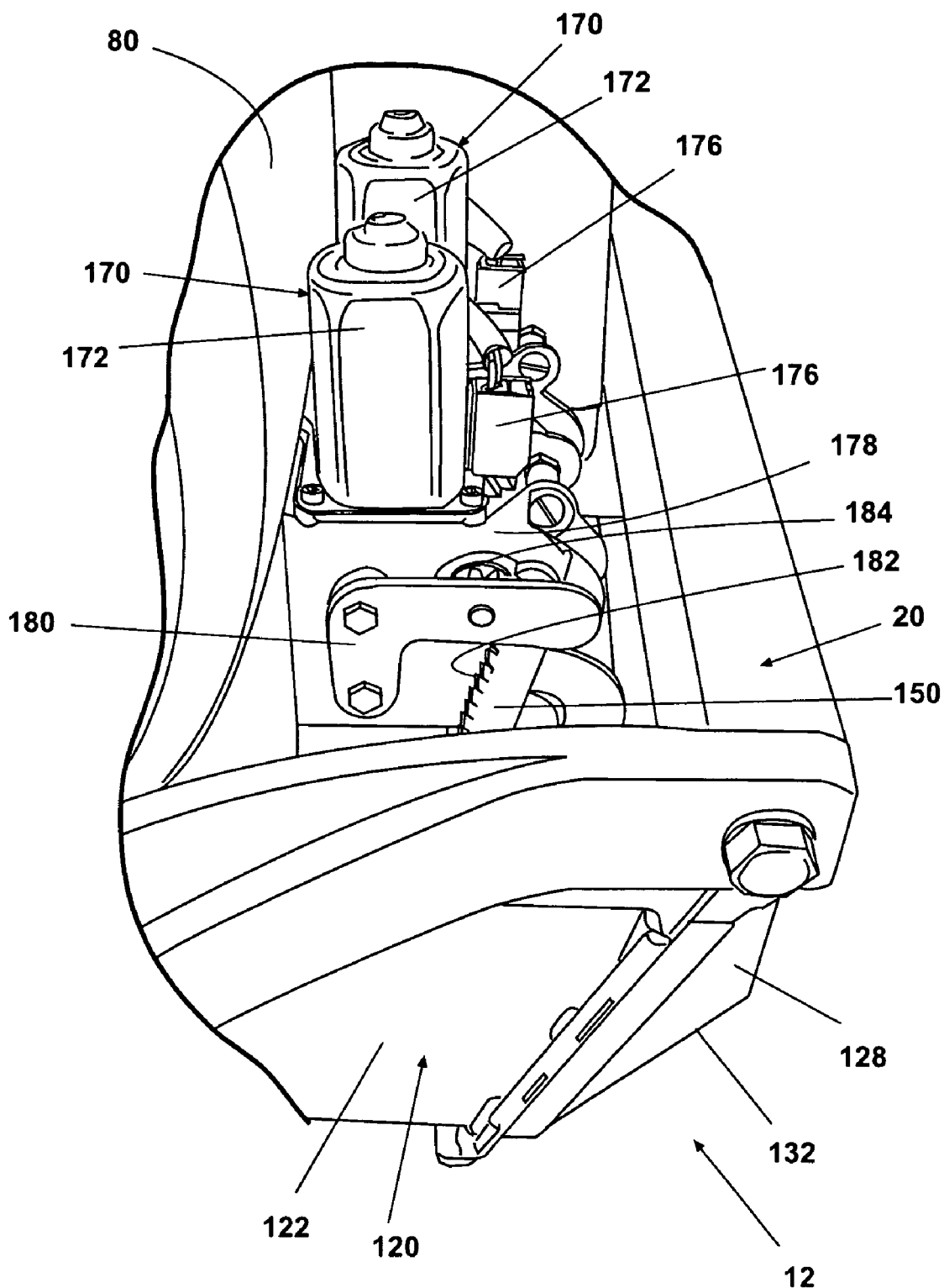
FIG. 18 is a first alternate enlarged perspective view of the actuator assembly illustrated in FIG. 17.
Figure 19:
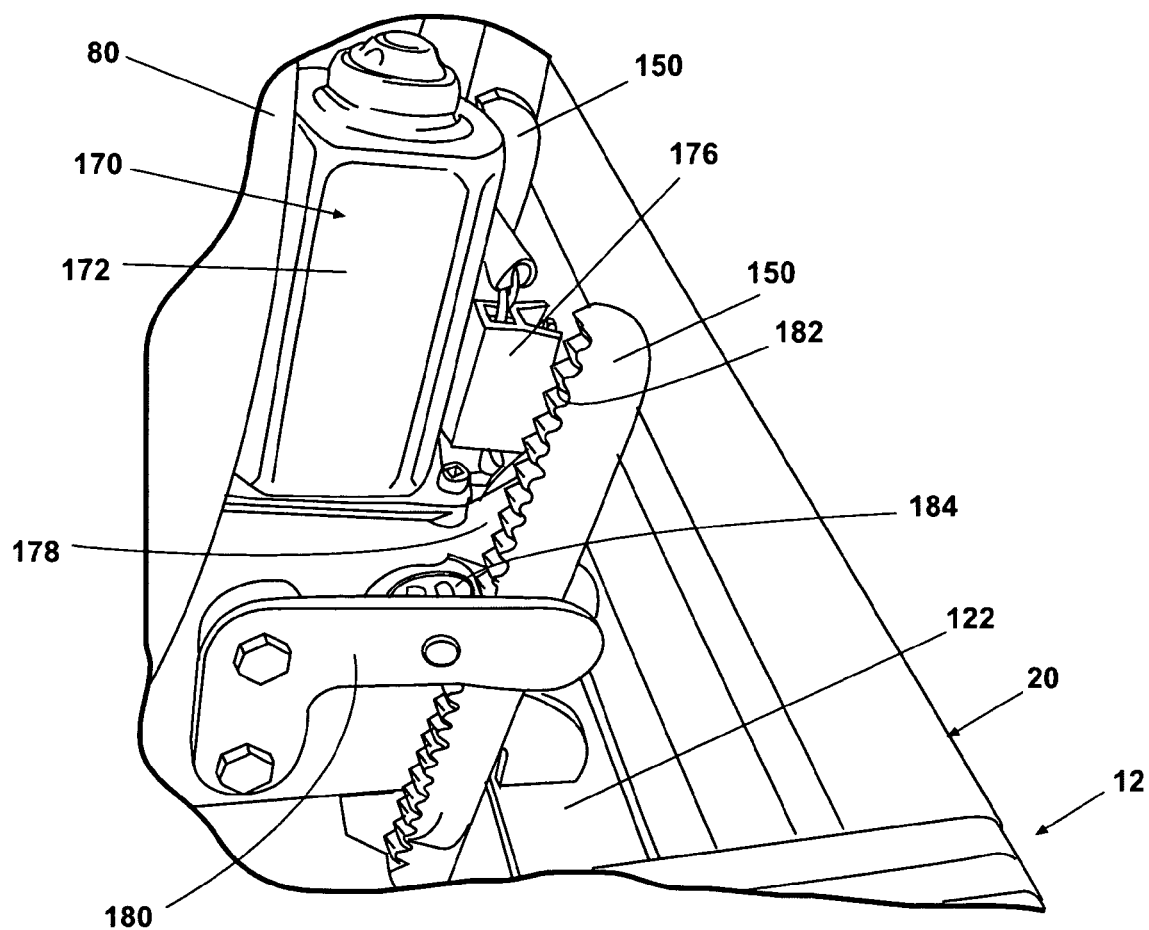
FIG. 19 is a second alternate enlarged perspective view of the actuator assembly illustrated in FIG. 17.

Referring now to FIGS. 17-19, a pair of deflector actuators 170 is mounted to the top wall 129 of the outlet chute 122 above the deflectors 140, 142 through a mounting bracket 178 and a retaining plate 180 having a suitable configuration for enabling the deflector actuators 170 to be fixedly mounted above the deflectors 140, 142. The deflector actuator 170 comprises a motor 172 operatively coupled to a transmission 174 comprising a spur gear 184. Preferably, the motor 172 is adapted with a worm gear (not shown) extending axially downwardly therefrom in operative disposition with a spur gear 184 so that rotation of the worm gear about a generally vertical axis will urge the rotation of the spur gear 184 about a generally horizontal axis. Electrical connectors 176 electrically couple the motors 172 to the deflector controls 62, 64. Motor vehicle window glass actuators for opening and closing motor vehicle windows have been found to be particularly well-suited to such an application.

The retaining plate 180 as illustrated is a generally L-shaped member which is spaced away from the mounting bracket 170 to accommodate the spur gear 184 and the actuator arm 150, 152 therebetween, and to maintain precise relative positioning of the spur gear 184 and the actuator arm 150, 152. The rotation of the spur gear 184 will urge the actuator arm 150, 152 into a linear translation tangential to the spur gear 184. A bearing (not shown) can be mounted between the mounting bracket 178 and the mounting plate 180 to bear against the planar edge of the actuator arm 150, 152 to maintain the actuator arm 150, 152 in registry with the spur gear 184. It will be evident that linear translation of the actuator arm 150, 152 will result in pivotal movement of the deflectors 140, 142 between an open and closed position.

Referring again to FIG. 7, the power assembly 16 comprises an internal combustion engine 190 having a crankshaft (not shown) connected to the impeller 82 through the locking bolt 84. Accordingly, operation of the engine 190 will urge the rotation of the impeller 82. Preferably, the engine 190 is a two cylinder, four-stroke gasoline engine delivering about 25 hp at 3600 rpm. Other power sources, such as an electric motor or a diesel engine, can be utilized having a horsepower and operating speed sufficient for the purposes described herein, and matched to the blower size and air flow output requirements of a particular blower. The engine 190 can alternatively be operatively connected with at least one of the rear traction wheels 24 by a transmission or clutch (not shown). The transmission/clutch may be any of various transmission/clutch assemblies available, including, and not limited to, hydraulic and mechanical transmissions, with the mechanical transmissions alternatively including belt drive, gear drive, and clutch drive assemblies, for example, as will be understood by one having ordinary skill in the art. Preferably, a dual hydraulic drive assembly, in which each rear traction wheel 24 is driven independently, is provided. Accordingly, the engine 190 is coupled with a belt pulley 192 adjacent the blower housing 80 for driving a belt 194 which, in turn, drives the hydraulic pumps, which are fluidly connected to a hydraulic fluid reservoir enclosed within the chassis 196 and mounted beneath the engine 190. Accordingly, the engine 190 drives both the hydraulic pumps and the impeller 82.

A vacuum hose coupler (not shown) shares several features of the safety cage 102, including a circular wall terminating in a circular lip and having a pair of diametrically-opposed lock bosses adapted for cooperative engagement with the lock slots 92 as previously described, and an actuator plate for activating the cutoff switch 94. The coupler is essentially a circular collar adapted in a manner similar to the circular wall 106 for slidable engagement with the flange 88, but without the inlet openings 110. The length of the coupler is preferably selected so that, when the coupler is inserted into the opening 116 and locked to the flange 88, the lip will be aligned with the front wall 86 of the blower housing 80 and spaced somewhat away from the forward edges 76 of the impeller blades 98. This will result in an air space between the coupler and the impeller blades 98.

A flexible vacuum hose (not shown) can be attached to the coupler in a well known manner, such as with a hose clamp, an adhesive, a bayonet coupling, a threaded coupling, and the like. The hose can have a diameter adapted to the diameter of the coupler for slidable insertion over the coupler, or the coupler can be integrated with or coupled with a reducer for use with a smaller diameter hose. When attached to the blower assembly 18, the vacuum hose can be used for vacuuming leaves, twigs, and other debris. The debris will be drawn into the blower assembly through the opening 116, to be discharged through the deflector assembly 120, which can be fitted with an outlet hose (not shown) for depositing the debris in a suitable container. The outlet hose can be adapted for coupling with the outlet chute 122, such as with a hose clamp, a bayonet coupling, a threaded coupling, and the like. The space between the lip of the coupler and the impeller blades 98 will enable large particles to be freely moved by the impeller 82 through the blower housing 80 and out the outlet opening 123.

The deflectors 140, 142 can be adjusted during operation between a fully open and a fully closed position in order to control the air flow and velocity of air delivered through the impeller outlet opening 123. When no air flow is desired, both deflectors 140, 142 can be fully closed in order to shut off the flow of air from the deflector assembly 120. The beveled edge 162 of each deflector plate 144, 146 can provide a more effective seal against the bottom wall 136 and consequently a more effective reduction of air flow. Partial opening of one or both deflectors 140, 142 will result in a relatively high air flow velocity from the outlet opening 123. Full opening of one or both deflectors 140, 142 will result in a somewhat lower air flow velocity from the outlet opening 123. As illustrated in FIG. 13, one deflector can be opened a small amount to provide a higher air flow velocity to facilitate the lifting and suspending of the debris to be removed. The second deflector can be opened a greater amount to provide a greater air flow, which will facilitate the lateral movement of the debris along the surface. By precise control of the deflectors 140, 142, debris can be readily suspended and moved away from the surface to be cleaned.

The flanges 158, 160 facilitate the delivery of air longitudinally along the deflector plates 144, 146 and out the outlet opening 123 rather than laterally across the outlet chamber 124, particularly when the deflectors 140, 142 are opened in different amounts as described above, thereby enhancing the effectiveness of the air flow and the debris removal. The inclination of the side walls 126, 128 relative to the bottom wall 136 facilitates the delivery of air downward to the adjacent surface, particularly when one or both deflectors 140, 142 are in a nearly closed configuration for increasing the velocity of the air flow from the blower outlet 120, to enhance the removal of debris immediately adjacent the blower outlet. Finally, because the air flow can be completely shut off by closing of the deflectors 140, 142, it is unnecessary to shut down the engine 190, or to utilize a costly transmission or clutch for disconnecting the engine 190 from the blower assembly which would increase the weight of the blower 10 and require additional maintenance. With the deflectors 140, 142 completely closed, the blower 10 can continue to operate at full speed, until the blowing operation is to resume.

In another embodiment, a pair of blower assemblies can be coupled in parallel, for example by utilizing a common axle connecting a pair of impellers to a single engine, with the impellers enclosed within a common housing or separate housings. Such a configuration would provide twice the air flow, and enhanced debris removal.

Alternatively, a riding blower according to the invention can be assembled as an integral yard maintenance unit, or can be configured to enable convenient separation of the blower assembly 18 from the power assembly 16 and the frame 20 for interchangeability of the blower assembly 18 with other implements or attachments that are adapted to be coupled with the frame 20 and power assembly 16 to be driven by the power assembly 16. Such alternative implements may include, for example, a snow blower head or a rotary brush.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A riding debris mover for moving debris on a surface from a first location to a second location, comprising:
    a frame coupled to a riding platform adapted to support a user;
    a plurality of wheels coupled to the frame comprising at least two opposing traction wheels for driving the riding blower;
    a power source coupled to the frame and operatively coupled with the at least two traction wheels, whereby the at least two traction wheels are rotated independently and the riding blower is propelled;
    a blower assembly having an air inlet opening and an air outlet opening, the blower assembly being supported by the frame and operatively coupled with the power source, whereby the blower assembly generates a stream of air from the air outlet opening; and
    a deflector assembly associated with the blower assembly and comprising at least one movable deflector, whereby the at least one movable deflector can be independently moved between an open position, a closed position, and a position intermediate the open position and closed position, to control the air flow and air flow velocity of the stream of air generated by the blower assembly;
    the blower deflector having top, side and bottom lips defining the air outlet opening with the side lips being inclined inwardly over at least a portion of their length toward the bottom lip, such that the air outlet opening opens both in a horizontal-lateral direction and in a vertically-downward direction;
    the at least one deflector being hingedly supported on a top wall that defines part of the air outlet opening and having an outer edge adjustably positionable to selectively deflect air in one or both of the horizontal-lateral direction and the vertically-downward direction.

2. A riding debris mover according to claim 1 and further comprising a safety cage operatively coupled with the air inlet opening for preventing the introduction of large particles into the blower assembly.

3. A riding debris mover for moving debris on a surface from a first location to a second location, comprising:
    a frame coupled to a riding platform adapted to support a user;
    a plurality of wheels coupled to the frame comprising at least two opposing traction wheels for driving the riding blower;
    a power source coupled to the frame and operatively coupled with the at least two traction wheels, whereby the at least two traction wheels are rotated independently and the riding blower is propelled;
    a blower assembly having an air inlet opening and an air outlet opening, the blower assembly being supported by the frame and operatively coupled with the power source, whereby the blower assembly generates a stream of air from the air outlet opening;
    a deflector assembly associated with the blower assembly and comprising at least one movable deflector, whereby the at least one movable deflector can be independently moved between an open position, a closed position, and a position intermediate the open position and closed position, to control the air flow and air flow velocity of the stream of air generated by the blower;
    wherein the riding platform supports a user in other than a sitting position; and
    pedestal that is connected to the frame and extends generally upward therefrom adjacent the support platform, and at least one control associated with the pedestal selected from a group that includes ignition switch, brake lever, parking brake lever, and hydraulic control.

4. A riding debris mover according to claim 3 wherein the blower assembly comprises at least one impeller.

5. A riding debris mover according to claim 3 wherein the deflector assembly comprises at least two deflector actuators each operatively coupled to a movable deflector for selectively moving the movable deflector.

6. A riding debris mover according to claim 3 and further comprising a collar coupled to a flexible hose, the collar having a bayonet connection, whereby the collar can be coupled with the air inlet opening to fluidly couple the flexible hose to the air inlet opening.

7. A riding debris mover according to claim 3 wherein the power source operatively coupled with the at least the two traction wheels is a hydraulic drive motor.

8. A riding debris mover according to claim 3 wherein the power source operatively coupled with the blower assembly is an internal combustion engine.

9. A riding debris mover according to claim 3 wherein the moving of the debris from a first location to a second location comprises blowing the debris.

10. A riding debris mover according to claim 3 wherein the moving of the debris from a first location to a second location comprises vacuuming the debris.

11. A riding debris mover according to claim 3 wherein the moving of the debris from a first location to a second location comprises loading the debris into a receptacle.

12. A riding debris mover according to claim 3 wherein the plurality of wheels comprises at least one front wheel coupled to a subframe, the subframe being pivotally coupled to the frame for articulation of the at least one front wheel about an axis that is generally parallel to the surface.

13. A riding debris mover for moving debris on a surface from a first location to a second location, comprising:
- a frame coupled to a riding platform adapted to support a user;
- a plurality of wheels coupled to the frame comprising at least two opposing traction wheels for driving the riding blower;
- a power source coupled to the frame and operatively coupled with the at least two traction wheels, whereby the at least two traction wheels are rotated independently and the riding blower is propelled;
- a blower assembly having an air inlet opening and an air outlet opening, the blower assembly being supported by the frame and operatively coupled with the power source, whereby the blower assembly generates a stream of air from the air outlet opening;
- a deflector assembly associated with the blower assembly and comprising at least one movable deflector, whereby the at least one movable deflector can be independently moved between an open position, a closed position, and a position intermediate the open position and closed position, to control the air flow and air flow velocity of the stream of air generated by the blower;
- wherein the riding platform supports a user in other than a sitting position; and
- wherein the deflector assembly comprises at least two deflector actuators each operatively coupled to a movable deflector for selectively moving the movable deflector.

14. A riding debris mover according to claim 13 wherein each deflector actuator comprises a motor and a worm gear, and is operatively coupled to a transmission having at least one spur gear for converting the rotation of the worm gear to rotation of the spur gear.

15. A riding debris mover according to claim 14 and further comprising at least two actuator arms each operatively coupled to a spur gear and pivotally coupled to one of the at least two movable deflectors for moving the movable deflector with operation of a deflector actuator.

16. A riding debris mover for moving debris on a surface from a first location to a second location, comprising:
- a frame coupled to a riding platform adapted to support a user;
- a plurality of wheels coupled to the frame comprising at least two opposing traction wheels for driving the riding blower;
- a power source coupled to the frame and operatively coupled with the at least two traction wheels, whereby the at least two traction wheels are rotated independently and the riding blower is propelled;
- a blower assembly having an air inlet opening and an air outlet opening, the blower assembly being supported by the frame and operatively coupled with the power source, whereby the blower assembly generates a stream of air from the air outlet opening;
- a deflector assembly associated with the blower assembly and comprising at least one movable deflector, whereby the at least one movable deflector can be independently moved between an open position, a closed position, and a position intermediate the open position and closed position, to control the air flow and air flow velocity of the stream of air generated by the blower;
- further comprising a safety cage operatively coupled with the air inlet opening for preventing the introduction of large particles into the blower assembly; and
- further comprising a bayonet connection wherein the safety cage is coupled with the air inlet opening through the bayonet connection.

17. A riding debris mover according to claim 16 wherein the riding platform supports a user in other than a sitting position.

18. A riding debris mover according to claim 16 wherein the plurality of wheels comprises at least one caster wheel.

19. A riding debris mover for moving debris on a surface from a first location to a second location, comprising:
- a frame coupled to a riding platform adapted to support a user;
- a plurality of wheels coupled to the frame comprising at least two opposing traction wheels for driving the riding blower;
- a power source coupled to the frame and operatively coupled with the at least two traction wheels, whereby the at least two traction wheels are rotated independently and the riding blower is propelled;
- a blower assembly having an air inlet opening and an air outlet opening, the blower assembly being supported by the frame and operatively coupled with the power source, whereby the blower assembly generates a stream of air from the air outlet opening;
- a deflector assembly associated with the blower assembly and comprising at least one movable deflector, whereby the at least one movable deflector can be independently moved between an open position, a closed position, and a position intermediate the open position and closed position, to control the air flow and air flow velocity of the stream of air generated by the blower;
- further comprising a safety cage operatively coupled with the air inlet opening for preventing the introduction of large particles into the blower assembly; and
- further comprising a shutoff switch associated with the air inlet opening and operable through the coupling of the safety cage with the air inlet opening.

20. A riding debris mover for moving debris on a surface from a first location to a second location, comprising:
- a frame coupled to a riding platform adapted to support a user;
- a plurality of wheels coupled to the frame comprising at least two opposing traction wheels for driving the riding blower;
- a power source coupled to the frame and operatively coupled with the at least two traction wheels, whereby the at least two traction wheels are rotated independently and the riding blower is propelled;

a blower assembly having an air inlet opening and an air outlet opening, the blower assembly being supported by the frame and operatively coupled with the power source, whereby the blower assembly generates a stream of air from the air outlet opening;

a deflector assembly associated with the blower assembly and comprising at least one movable deflector, whereby the at least one movable deflector can be independently moved between an open position, a closed position, and a position intermediate the open position and closed position, to control the air flow and air flow velocity of the stream of air generated by the blower assembly;

wherein the power source is adapted to rotate a shaft; and wherein the blower assembly includes an impeller operatively coupled with the power source, the impeller comprising at least one impeller blade for moving air through the blower when the impeller is rotated by the power source whereby the blower assembly generates a stream of air from the air outlet opening; and a safety cage adapted for coupling with the air inlet opening and comprising a circular wall terminating in a circular lip; and wherein when the safety cage is coupled with the air inlet opening, the circular lip is positioned immediately adjacent the at least one impeller blade to define an airflow path from the air inlet opening through the impeller that minimizes the flow of air from between the circular lip and the at least one impeller blade.

21. A riding debris mover according to claim 20 and further comprising a bayonet connection wherein the safety cage is coupled with the air inlet opening through the bayonet connection.

22. A riding debris mover according to claim 20 and further comprising a shutoff switch associated with the air inlet opening and operable through the coupling of the safety cage with the air inlet opening.

23. A riding debris mover according to claim 20 wherein the moving of the debris from the first location to the second location comprises blowing the debris.

24. A riding debris mover according to claim 20 wherein the moving of the debris from the first location to the second location comprises vacuuming the debris.

25. A riding debris mover according to claim 20 wherein the moving of the debris from the first location to the second location comprises loading the debris into a receptacle.

26. A riding debris mover for moving debris on a surface from a first location to a second location, comprising:

a frame coupled to a riding platform adapted to support a user;

a plurality of wheels coupled to the frame comprising at least two opposing traction wheels for driving the riding blower;

a power source coupled to the frame and operatively coupled with the at least two traction wheels, whereby the at least two traction wheels are rotated independently and the riding blower is propelled;

a blower assembly having an air inlet opening and an air outlet opening, the blower assembly being supported by the frame and operatively coupled with the power source, whereby the blower assembly generates a stream of air from the air outlet opening; and a deflector assembly associated with the blower assembly and comprising at least one movable deflector, whereby the at least one movable deflector can be independently moved between an open position, a closed position, and a position intermediate the open position and closed position, to control the air flow and air flow velocity of the stream of air generated by the blower assembly; the deflector assembly having top, side and bottom walls defining the air outlet opening with the side walls being spaced a first distance apart; the at least one deflector including first and second deflectors positioned between the spaced side walls in horizontally-adjacent positions, and being independently adjustable to selectively deflect air exiting the air outlet opening.

27. The riding debris mover defined in claim 26, wherein the removable cage includes a circular lip that, when attached to the blower assembly, positions the circular lip closely adjacent the at least one impeller blade to increase effectiveness and air output of the at least one impeller blade.

* * * * *